US012771514B2

(12) United States Patent
Rico Alvarino et al.

(10) Patent No.: US 12,771,514 B2
(45) Date of Patent: Oct. 20, 2026

(54) FLEXIBLE CHANNEL RASTER FOR FREQUENCY BAND

(71) Applicant: QUALCOMM Incorporated, San Diego, CA (US)

(72) Inventors: Alberto Rico Alvarino, San Diego, CA (US); Alexandros Manolakos, Escondido, CA (US); Seyedkianoush Hosseini, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 18/548,490

(22) PCT Filed: Apr. 1, 2022

(86) PCT No.: PCT/US2022/023145
§ 371 (c)(1),
(2) Date: Aug. 30, 2023

(87) PCT Pub. No.: WO2022/256078
PCT Pub. Date: Dec. 8, 2022

(65) Prior Publication Data

US 2024/0146488 A1 May 2, 2024

(30) Foreign Application Priority Data

Jun. 3, 2021 (GR) .............................. 20210100363

(51) Int. Cl.
*H04L 5/00* (2006.01)

(52) U.S. Cl.
CPC .......... *H04L 5/0092* (2013.01); *H04L 5/0048* (2013.01); *H04L 5/0069* (2013.01)

(58) Field of Classification Search
CPC ... H04L 5/0092; H04L 5/0048; H04L 5/0069; H04L 5/0091
See application file for complete search history.

(56) References Cited

U.S. PATENT DOCUMENTS

2020/0136881 A1* 4/2020 Berggren ............ H04L 27/2675
2020/0245290 A1* 7/2020 Jiang ..................... H04W 68/02
(Continued)

FOREIGN PATENT DOCUMENTS

WO WO-2020252684 A1 12/2020

OTHER PUBLICATIONS

Ericsson: "SSB Raster Design of Rel-16 NR-U", 3GPP Draft, 3GPP TSG-RAN4 Meeting #90bis, R4-1904255 (R16 NR-U) SSB Raster of NR-U, 3rd Generation Partnership Project (3GPP), Mobile Competence Centre, 650, Route Des Lucioles, F-06921 Sophia-Antipolis Cedex, France, vol. RAN WG4, No. Xian, China, Apr. 8, 2019-Apr. 13, 2019, Apr. 1, 2019 (Apr. 1, 2019), XP051714603, 8 Pages, Retrieved from the Internet: URL: http://www.3gpp.org/ftp/tsg%5Fran/WG4%5FRadio/TSGR4%5F90Bis/Docs/R4%2D1904255%2Ezip [Retrieved on Apr. 1, 2019] p. 1.
(Continued)

*Primary Examiner* — Chae S Lee
(74) *Attorney, Agent, or Firm* — Holland & Hart LLP

(57) ABSTRACT

Methods, systems, and devices for wireless communications are described. A user equipment (UE) may monitor a set of frequencies in a frequency band for a synchronization signal block (SSB) according to an initial channel raster. The initial channel raster may be associated with an initial cell or an initial base station. The UE may receive an indication of one or more frequencies for an updated channel raster associated with another cell or another base station. The initial channel raster and the updated channel raster may be different. The UE may monitor for another SSB according to the updated
(Continued)

channel raster, which may include additional frequencies within a same frequency band or a different frequency band.

30 Claims, 16 Drawing Sheets

(56) References Cited

U.S. PATENT DOCUMENTS

| | | | | |
|---|---|---|---|---|
| 2021/0045170 | A1 | 2/2021 | Luo et al. | |
| 2021/0126822 | A1* | 4/2021 | Jung | H04L 27/26025 |
| 2021/0195663 | A1* | 6/2021 | Da Silva | H04W 36/0058 |

OTHER PUBLICATIONS

International Search Report and Written Opinion—PCT/US2022/023145—ISA/EPO—Jun. 30, 2022.

* cited by examiner

FLEXIBLE CHANNEL RASTER FOR FREQUENCY BAND

CROSS REFERENCE

The present Application is a 371 national stage filing of International PCT Application No. PCT/US2022/023145 by RICO ALVARINO et al. entitled "FLEXIBLE CHANNEL RASTER FOR FREQUENCY BAND," filed Apr. 1, 2022; and claims priority to Greece Patent Application No. 20210100363 by RICO ALVARINO et al., entitled "FLEXIBLE CHANNEL RASTER FOR FREQUENCY BAND," filed Jun. 3, 2021, each of which is assigned to the assignee hereof, and each of which is expressly incorporated by reference in its entirety herein.

FIELD OF TECHNOLOGY

The following relates to wireless communications, including a flexible channel raster for a frequency band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support a flexible channel raster for a frequency band. Generally, the described techniques provide for a user equipment (UE) to receive an indication of a channel raster update from a base station or a cell after connecting to the base station or cell or reading a system information block (SIB). In some cases, the UE may monitor a set of frequencies in a frequency band for a synchronization signal block (SSB) according to an initial channel raster. The UE may receive an indication of one or more frequencies for an updated channel raster. The UE may monitor for another SSB according to the updated channel raster. In some cases, the updated channel raster may include additional frequencies within a frequency band.

A method for wireless communications at a UE is described. The method may include monitoring a first set of one or more frequencies within a frequency band for a first SSB associated with a first cell, the first set of one or more frequencies corresponding to a first channel raster, receiving, from the first cell and based on the monitoring, an indication of a second channel raster corresponding to the frequency band, where the second channel raster is different from the first channel raster, and monitoring a second set of one or more frequencies within the frequency band for a second SSB associated with at least one second cell of a set of multiple second cells, the second set of one or more frequencies corresponding to the second channel raster.

An apparatus for wireless communications at a UE is described. The apparatus may include a processor, memory coupled with the processor, and instructions stored in the memory. The instructions may be executable by the processor to cause the apparatus to monitor a first set of one or more frequencies within a frequency band for a first SSB associated with a first cell, the first set of one or more frequencies corresponding to a first channel raster, receive, from the first cell and based on the monitoring, an indication of a second channel raster corresponding to the frequency band, where the second channel raster is different from the first channel raster, and monitor a second set of one or more frequencies within the frequency band for a second SSB associated with at least one second cell of a set of multiple second cells, the second set of one or more frequencies corresponding to the second channel raster.

Another apparatus for wireless communications at a UE is described. The apparatus may include means for monitoring a first set of one or more frequencies within a frequency band for a first SSB associated with a first cell, the first set of one or more frequencies corresponding to a first channel raster, means for receiving, from the first cell and based on the monitoring, an indication of a second channel raster corresponding to the frequency band, where the second channel raster is different from the first channel raster, and means for monitoring a second set of one or more frequencies within the frequency band for a second SSB associated with at least one second cell of a set of multiple second cells, the second set of one or more frequencies corresponding to the second channel raster.

A non-transitory computer-readable medium storing code for wireless communications at a UE is described. The code may include instructions executable by a processor to monitor a first set of one or more frequencies within a frequency band for a first SSB associated with a first cell, the first set of one or more frequencies corresponding to a first channel raster, receive, from the first cell and based on the monitoring, an indication of a second channel raster corresponding to the frequency band, where the second channel raster is different from the first channel raster, and monitor a second set of one or more frequencies within the frequency band for a second SSB associated with at least one second cell of a set of multiple second cells, the second set of one or more frequencies corresponding to the second channel raster.

Some examples of the method, apparatuses, and non-transitory computer-readable medium described herein may further include operations, features, means, or instructions for determining the UE may be within a geographic region, where monitoring the second set of one or more frequencies may be based on determining the UE may be within the geographic region.

In some examples of the method, apparatuses, and non-transitory computer-readable medium described herein, receiving the indication of the second channel raster may include operations, features, means, or instructions for receiving an indication of the geographic region associated with the second channel raster.

Some examples of the method, apparatuses, and non-transitory computer-readable medium described herein may further include operations, features, means, or instructions for determining a timing threshold associated with the second channel raster may be satisfied, where monitoring the second set of one or more frequencies may be based on determining the timing threshold associated with the second channel raster may be satisfied.

In some examples of the method, apparatuses, and non-transitory computer-readable medium described herein, receiving the indication of the second channel raster may include operations, features, means, or instructions for receiving an indication of the timing threshold associated with the second channel raster.

In some examples of the method, apparatuses, and non-transitory computer-readable medium described herein, receiving the indication of the second channel raster may include operations, features, means, or instructions for receiving one or more of: a SIB including the indication of the second channel raster, radio resource control (RRC) signaling including the indication of the second channel raster, or a medium access control-control element (MAC-CE) including the indication of the second channel raster.

In some examples of the method, apparatuses, and non-transitory computer-readable medium described herein, the indication of the second channel raster includes one or more bandwidths associated with the second channel raster.

In some examples of the method, apparatuses, and non-transitory computer-readable medium described herein, the first cell may be associated with a first radio access technology (RAT) and the at least one second cell may be associated with a second RAT.

In some examples of the method, apparatuses, and non-transitory computer-readable medium described herein, a list of channel rasters for the second RAT includes the second channel raster.

A method for wireless communications at a first cell is described. The method may include transmitting, to a UE and using a first set of one or more frequencies within a frequency band, a first SSB associated with the first cell, the first set of one or more frequencies corresponding to a first channel raster and transmitting, based on transmitting the first SSB, an indication of a second channel raster corresponding to the frequency band, where the second channel raster is different from the first channel raster and associated with a second set of one or more frequencies within the frequency band corresponding to at least one second cell of a set of multiple second cells.

An apparatus for wireless communications at a first cell is described. The apparatus may include a processor, memory coupled with the processor, and instructions stored in the memory. The instructions may be executable by the processor to cause the apparatus to transmit, to a UE and using a first set of one or more frequencies within a frequency band, a first SSB associated with the first cell, the first set of one or more frequencies corresponding to a first channel raster and transmit, based on transmitting the first SSB, an indication of a second channel raster corresponding to the frequency band, where the second channel raster is different from the first channel raster and associated with a second set of one or more frequencies within the frequency band corresponding to at least one second cell of a set of multiple second cells.

Another apparatus for wireless communications at a first cell is described. The apparatus may include means for transmitting, to a UE and using a first set of one or more frequencies within a frequency band, a first SSB associated with the first cell, the first set of one or more frequencies corresponding to a first channel raster and means for transmitting, based on transmitting the first SSB, an indication of a second channel raster corresponding to the frequency band, where the second channel raster is different from the first channel raster and associated with a second set of one or more frequencies within the frequency band corresponding to at least one second cell of a set of multiple second cells.

A non-transitory computer-readable medium storing code for wireless communications at a first cell is described. The code may include instructions executable by a processor to transmit, to a UE and using a first set of one or more frequencies within a frequency band, a first SSB associated with the first cell, the first set of one or more frequencies corresponding to a first channel raster and transmit, based on transmitting the first SSB, an indication of a second channel raster corresponding to the frequency band, where the second channel raster is different from the first channel raster and associated with a second set of one or more frequencies within the frequency band corresponding to at least one second cell of a set of multiple second cells.

Some examples of the method, apparatuses, and non-transitory computer-readable medium described herein may further include operations, features, means, or instructions for determining the UE may be within a geographic region, where transmitting the indication of the second channel raster may be based on determining the UE may be within the geographic region.

In some examples of the method, apparatuses, and non-transitory computer-readable medium described herein, transmitting the indication of the second channel raster may include operations, features, means, or instructions for transmitting an indication of the geographic region associated with the second channel raster.

Some examples of the method, apparatuses, and non-transitory computer-readable medium described herein may further include operations, features, means, or instructions for determining a timing threshold associated with the second channel raster may be satisfied, where transmitting the indication of the second channel raster may be based on determining the timing threshold associated with the second channel raster may be satisfied.

In some examples of the method, apparatuses, and non-transitory computer-readable medium described herein, transmitting the indication of the second channel raster may include operations, features, means, or instructions for transmitting an indication of the timing threshold associated with the second channel raster.

In some examples of the method, apparatuses, and non-transitory computer-readable medium described herein, transmitting the indication of the second channel raster may include operations, features, means, or instructions for transmitting a SIB including the indication of the second channel raster, transmitting RRC signaling including the indication of the second channel raster, or transmitting a MAC-CE including the indication of the second channel raster.

In some examples of the method, apparatuses, and non-transitory computer-readable medium described herein, the indication of the second channel raster includes one or more bandwidths associated with the second channel raster.

In some examples of the method, apparatuses, and non-transitory computer-readable medium described herein, the first cell may be associated with a first RAT and the at least one second cell may be associated with a second RAT.

In some examples of the method, apparatuses, and non-transitory computer-readable medium described herein, a list of channel rasters for the second RAT includes the second channel raster.

DETAILED DESCRIPTION

In some communications systems, a user equipment (UE) may communicate with one or more base stations using channels in a frequency band. In some cases, the channels may be separated by a distance within the frequency band, which may be referred to as a channel raster. During a cell search procedure to connect with a base station, the UE may search for synchronization signals (e.g., in a synchronization signal block (SSB)) across a set of frequencies defined by the channel raster. If the channel raster provides a relatively dense set of frequencies (e.g., close together in the frequency band), there may be an increased deployment flexibility, but the UE may have more locations in the frequency band to search for the synchronization signals. Similarly, if the channel raster is sparse, it may be easier for the UE to find the synchronization signals, but flexibility may decrease. However, the channel raster may not be flexible enough to allow different services to coexist in the same frequency band.

A UE may monitor one or more frequencies within a frequency band for one or more SSBs of an initial cell based on a default channel raster. Once the UE connects with the initial cell, the UE may receive information indicating for the UE to update the channel raster. For example, the UE may receive a system information block (SIB), radio resource control (RRC) signaling, or a medium access control-control element (MAC-CE) indicating the updated channel raster (e.g., one or more bandwidths for the updated channel raster). In some cases, the UE may monitor different frequencies within a frequency band (e.g., a same frequency band as the initial cell or a different frequency band) for additional SSBs of other cells based on the updated channel raster. In some examples, the UE may use an enhanced channel raster to monitor for the additional SSBs, which may be defined at the UE. In some cases, the UE may use the enhanced channel raster based on a geographical region, a configured timer, or according to UE implementation.

Aspects of the disclosure are initially described in the context of wireless communications systems. Aspects of the disclosure are further described in the context of a resource diagram and a process flow. Aspects of the disclosure are further illustrated by and described with reference to apparatus diagrams, system diagrams, and flowcharts that relate to a flexible channel raster for a frequency band.

Figure 1:
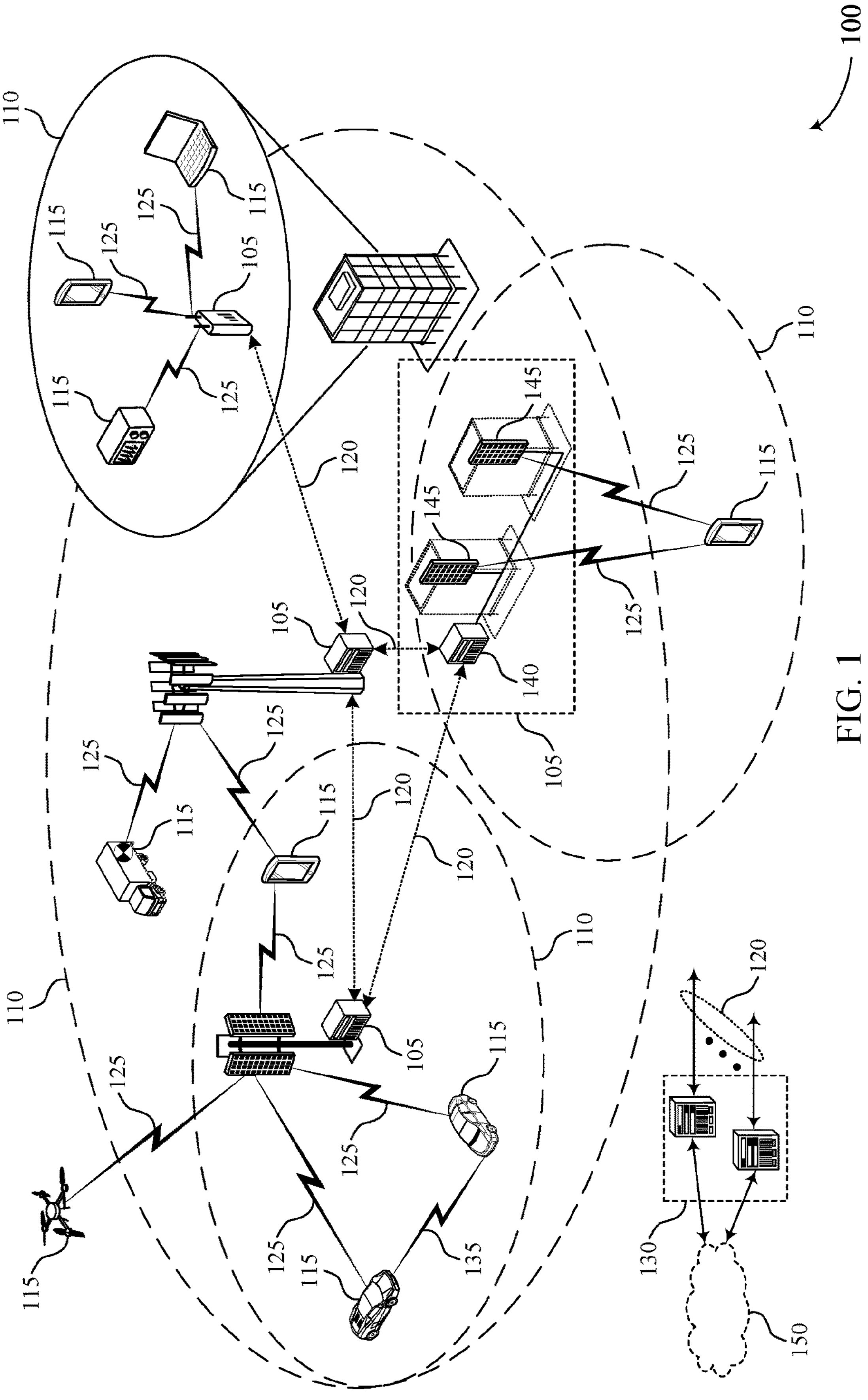
FIGS. 1 and 2 illustrate examples of wireless communications systems that support a flexible channel raster for a frequency band in accordance with aspects of the present disclosure.

FIG. 1 illustrates an example of a wireless communications system 100 that supports a flexible channel raster for a frequency band in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (RAT) (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may monitor for and receive synchronization signals in an SSB from a cell or base station 105. The base station 105 may transmit the SSBs within a frequency band according to an initial channel raster, which may define a set of frequencies over which a base station 105 or cell may transmit an SSB. The UE 115 may search in the frequencies defined by the channel raster for the SSB. However, there may be a tradeoff between flexibility of a deployment and granularity of a channel raster. For example, if the channel raster is relatively dense, there may be increased deployment flexibility, but the UE 115 may have more locations to search for the SSB. In some other examples, if the channel raster is relatively sparse, it may be easier for the UE 115 to find the SSB, but there may be decreased flexibility.

In some examples, a UE 115 may receive an indication of a channel raster update from a base station 105 or a cell after connecting to the base station 105 or cell or reading a SIB. The channel raster update may indicate one or more frequencies for an updated channel raster. The UE 115 may monitor for another SSB according to the updated channel raster. The updated channel raster may include additional frequencies within the frequency band, which is described in further detail with respect to FIG. 3. In some examples, the UE 115 may obtain a channel raster for a given RAT from a cell operating according to another RAT.

Figure 2:
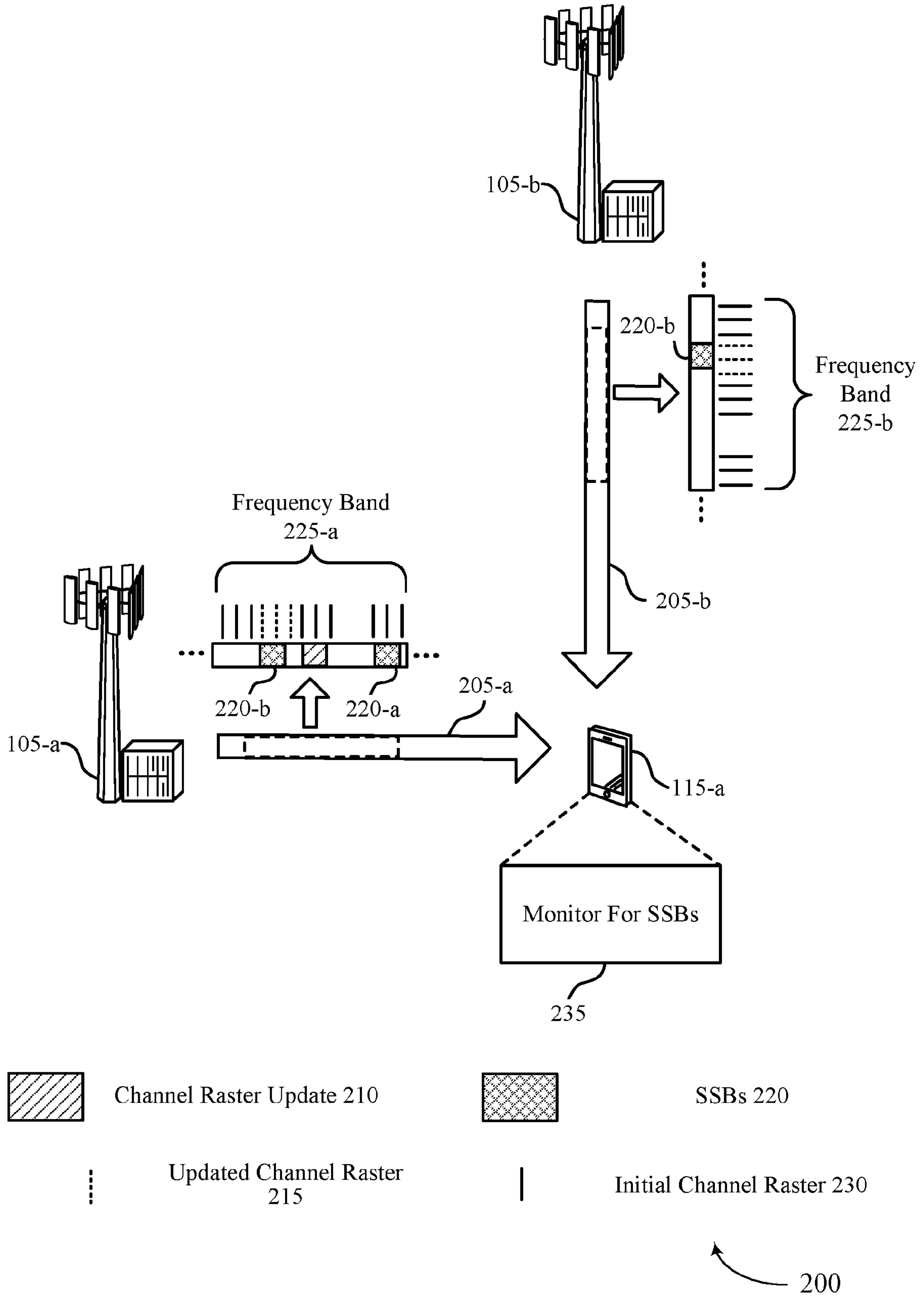

FIG. 2 illustrates an example of a wireless communications system 200 that supports a flexible channel raster for a frequency band in accordance with aspects of the present disclosure. In some examples, wireless communications system 200 may implement aspects of wireless communications system 100 and may include a UE 115-*a*, a base station 105-*a*, and a base station 105-*b*, which may be examples of a UE 115 and base stations 105 with coverage areas as described with reference to FIG. 1. In some examples, base station 105-*a*, base station 105-*b*, and UE 115-*a* may communicate control information, data, or both using a downlink communication link 205 and an uplink communication link. For example, base station 105-*a* may transmit an indication of a channel raster update 210 to UE 115-*a* for an updated channel raster 215. Base station 105-*a* and base station 105-*b* may transmit SSBs 220 to UE 115-*a* via downlink communication link 205-*a* and downlink communication link 205-*b*, respectively.

In some examples, a UE 115 may monitor for and receive synchronization signals from a cell or base station 105. The UE 115 may use the synchronization signals to determine configuration and timing information for transmitting and receiving subsequent messages with the cell or base station 105. In some examples, the base station 105 may transmit one or more SSBs 220 including the synchronization signals, such as a primary synchronization signal (PSS), a secondary synchronization signal (SSS), a physical broadcast channel (PBCH), a master information block (MIB), or a combination thereof. In some cases, the base station 105 may transmit the SSBs 220 within a frequency band 225 according to an initial channel raster 230. For example, base station 105-*a* may transmit SSB 220-*a* in frequency band 225-*a* according to the initial channel raster 230.

In some cases, a channel raster, such as an initial channel raster 230, may define a set of frequencies (e.g., within a frequency band 225) over which a base station 105 or cell may transmit an SSB 220. For example, base station 105-*a* may use a defined channel raster, such as a configured or otherwise defined initial channel raster 230, to transmit SSB 220-*a* within frequency band 225-*a* to UE 115-*a* via downlink communication link 205-*a*. Similarly, base station 105-*b* may use a different defined channel raster to transmit SSB 220-*b* within a same frequency band 225 or within a different frequency band 225 (e.g., frequency band 225-*a* or frequency band 225-*b*, respectively) to UE 115-*a* via downlink communication link 205-*b*. In some examples, at 235, UE 115-*a* may monitor for one or more SSBs 220, such as SSB 220-*a*. That is, a UE 115 may search in the frequencies defined by the channel raster for an SSB 220. However, there may be a tradeoff between flexibility of a deployment and granularity of a channel raster. For example, if the channel raster is relatively dense, there may be increased deployment flexibility, but the UE 115 may have more locations to search for the SSB 220. In some other examples, if the channel raster is relatively sparse, it may be easier for the UE 115 to find the SSB 220, but there may be decreased flexibility.

In some examples, a UE 115 may receive an indication of a channel raster update 210 from a base station 105 or a cell after connecting to the base station 105 or cell or reading a SIB (such as a SIB included in an SSB 220-*a* from the initial channel raster 230). For example, UE 115-*a* may receive an indication of a channel raster update 210 from base station 105-*a* via downlink communication link 205-*a*. In some cases, base station 105-*a* may send the channel raster update 210 according to the initial channel raster 230 within a frequency band 225, such as frequency band 225-*a*. The channel raster update 210 may indicate one or more frequencies for an updated channel raster 215. In some examples, UE 115-*a* may perform an initial search (e.g., for SSB 220-*a*) based on a defined channel raster, such as an initial channel raster 230, but after reading a SIB, the UE 115-*a* may receive information regarding the updated channel raster 215 (e.g., about additional points where cells may be found). For example, UE 115-*a* may monitor (e.g., at 235) for another SSB 220, such as SSB 220-*b*, according to the updated channel raster 215.

The updated channel raster 215 may indicate one or more frequencies used by a different cell or base station 105, such as base station 105-*b*. For example, the updated channel raster 215 may be for a different cell than the initial channel raster 230. Thus, SSB 220-*b* may be from a different cell than SSB 220-*a* (e.g., from base station 105-*b* rather than base station 105-*a*). The updated channel raster 215 may include additional frequencies within a frequency band 225, which is described in further detail with respect to FIG. 3. In some examples, the additional frequencies may be included in a same frequency band 225 as the initial channel raster 230, such as frequency band 225-*a*. In some other examples, the additional frequencies may be included in a different frequency band 225 than the initial channel raster 230, such as frequency band 225-*b*.

In some cases, base station 105-*a* or a cell may include the channel raster update 210 in the SIB, RRC signaling, a MAC-CE, or the like. The indication of the channel raster update 210 may include a bandwidth (e.g., from 1 GHz to 1.1 GHz the channel raster is 100 kHz). The SSBs 220 in the updated raster locations may be cell-defining SSBs 220, but may not be found by an initial search of UE 115-*a*. For example, SSB 220-*b* may be a cell defining SSB 220 within a frequency of frequency band 225-*b* according to the updated channel raster 215. In some cases, the updated channel raster 215 may have increased raster flexibility when compared with the initial channel raster 230 (e.g., for intra-channel coexistence with multiple services, such as NR and wideband CDMA (WCDMA) in a same frequency band 225).

In some examples, UE 115-*a* may obtain a channel raster for a given RAT (e.g., NR) from a cell operating according to another RAT (e.g., LTE or Wi-Fi). For example, a SIB, RRC signaling, or a MAC-CE in LTE may indicate the channel raster for UE 115-*a* to use for NR communications. In some cases, there may be a separate list of flexible or updated channel rasters 215 for each RAT. UE 115-*a* may decide when to use an enhanced channel raster, such as an updated channel raster 215, or a baseline channel raster, such as the initial channel raster 230. In some examples, a network may define a geographical region (e.g., via a set of coordinates, polygons, or distance from a center) in which the enhanced channel raster applies. Additionally or alternatively, the network may define a timing threshold after which UE 115-*a* may stop using the enhanced channel raster. In some examples, UE 115-*a* may receive an indication of the region, the timer, or both from base station 105-*a*. For example, base station 105-*a* may include the indication in a SIB, RRC signaling, or a MAC-CE. In some other cases, UE 115-*a* may determine whether to use the enhanced channel raster according to UE implementation.

Figure 3:
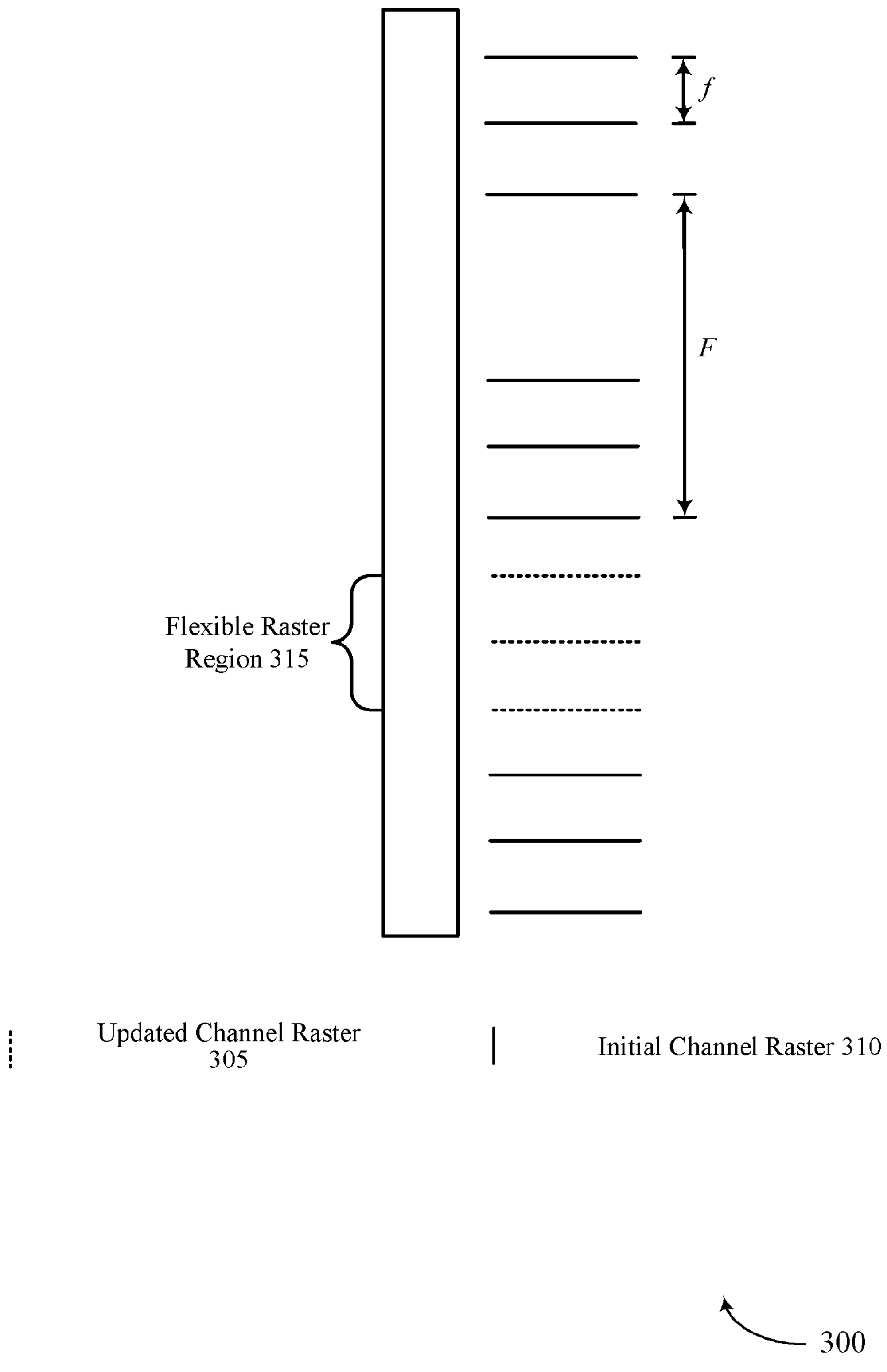
FIG. 3 illustrates an example of a resource diagram that supports a flexible channel raster for a frequency band in accordance with aspects of the present disclosure.

FIG. 3 illustrates an example of a resource diagram 300 that supports a flexible channel raster for a frequency band in accordance with aspects of the present disclosure. In some examples, resource diagram 300 may implement aspects of wireless communications system 100 and wireless communications system 200. For example, resource diagram 300 may be implemented by a UE 115 and a base station 105 as described with reference to FIGS. 1 and 2. In some cases, a base station may transmit an indication of an updated channel raster 305 for a channel raster to monitor for SSBs to a UE.

In some examples, a frequency band may have one or more different channel rasters (e.g., finer in some regions due to increased flexibility). For example, a UE may use an initial channel raster 310 to monitor for one or more SSBs from a cell or a base station. The initial channel raster 310 may be configured or otherwise defined at the UE. The UE may monitor for SSBs according to a frequency, f, for each channel raster (e.g., a frequency of 100 kHz for an initial channel raster 310). The channel rasters may also have a periodicity, F (e.g., a periodicity of 1200 kHz for the initial channel raster 310), which the UE may use to determine a period for monitoring f for SSBs.

One or more UEs may not identify the cells with finer channel rasters (e.g., channel rasters with a lower value of f), since the cells may be defined with a channel raster the UE may not know about. In some case, a UE may receive information regarding an updated channel raster 305 in a flexible raster region 315 from a base station. For example, the base station may indicate an additional raster may be present. The UE may monitor for SSBs from cells using the updated channel raster 305. Additionally or alternatively, the UEs may receive the frequency band including the flexible raster region 315 without signaling (e.g., by using the updated channel raster 305 independent of signaling from a base station).

In some cases, the UE may monitor a different channel raster for SSBs from each base station or cell, as described with reference to FIG. 2. The UE may monitor for SSBs within a different frequency band for each base station or cell or within a same frequency band for the different base stations or cells.

Figure 4:
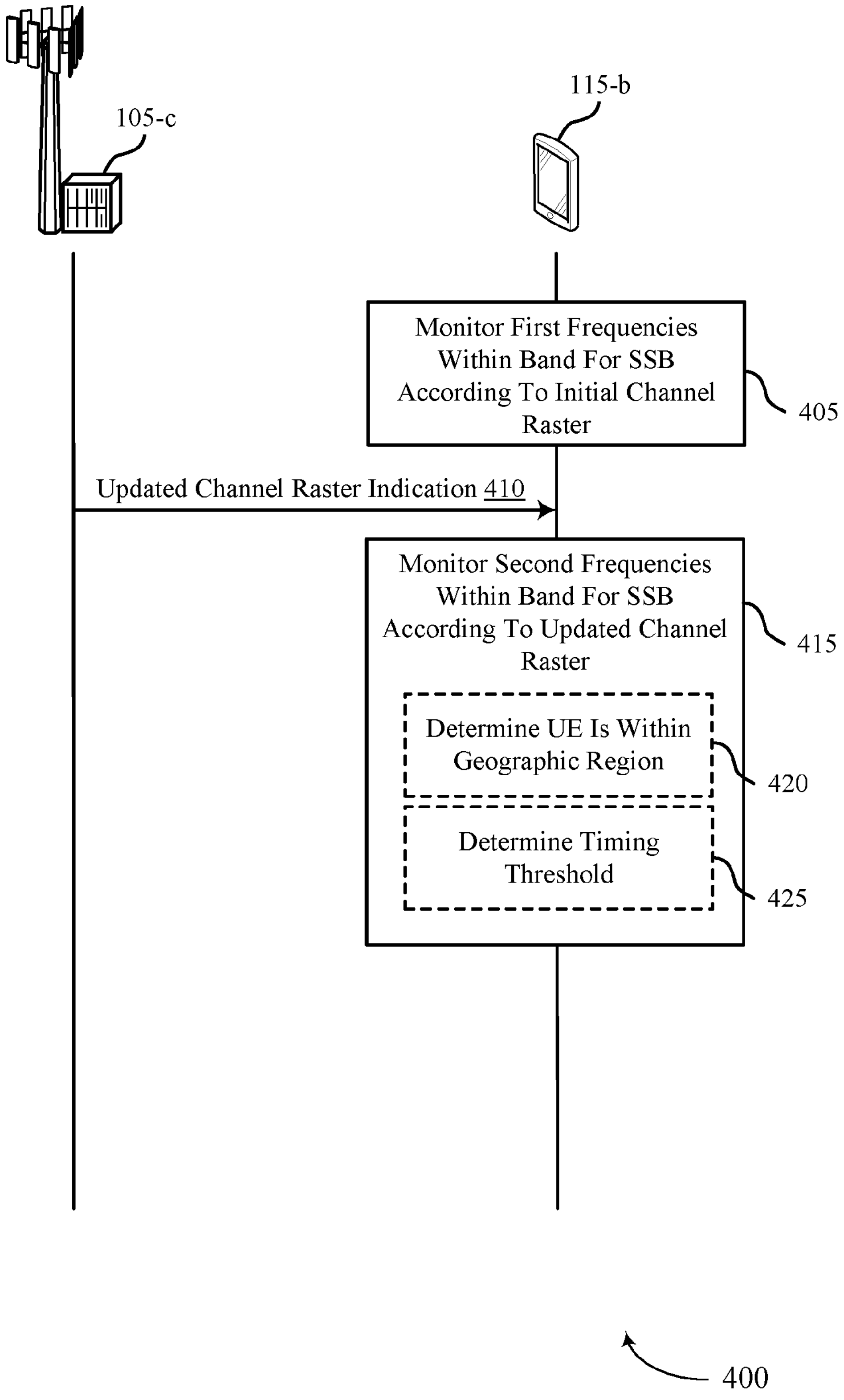
FIG. 4 illustrates an example of a process flow that supports a flexible channel raster for a frequency band in accordance with aspects of the present disclosure.

FIG. 4 illustrates an example of a process flow 400 that supports a flexible channel raster for a frequency band in accordance with aspects of the present disclosure. In some examples, process flow 400 may implement aspects of wireless communications system 100, wireless communications system 200, and resource diagram 300. The process flow 400 may illustrate an example of a UE 115-*b* receiving an updated channel raster for receiving one or more SSBs from a base station 105-*c* or cell. Alternative examples of the following may be implemented, where some processes are performed in a different order than described or are not performed. In some cases, processes may include additional features not mentioned below, or further processes may be added.

At 405, UE 115-*b* may monitor a set of one or more frequencies within a frequency band for an SSB from a cell. In some cases, the set of one or more frequencies may be included in an initial channel raster. The initial channel raster may be configured, defined, or otherwise determined at UE 115-*b*.

At 410, UE 115-*b* may receive an indication of an updated channel raster from the cell or base station 105-*c*. For example, UE 115-*b* may receive an indication of one or more frequencies or frequency intervals for the updated channel raster based on monitoring for the SSB. The updated channel raster may be within the frequency band and may be different from the initial channel raster. Additionally or alternatively, the updated channel raster may be within a different frequency band. In some cases, UE 115-*b* may receive one or more of a SIB including the indication of the updated channel raster, RRC signaling including the indication of the updated channel raster, or a MAC-CE including the indication of the updated channel raster. The indication of the updated channel raster may include one or more bandwidths (e.g. intervals of frequencies) covered by the updated channel raster.

At 415, UE 115-*b* may monitor other frequencies within a frequency band for another SSB according to the updated channel raster (e.g., the same frequency band or a different frequency band). The other SSB may be from a different cell of base station 105-*c* or a cell of a different base station 105. The initial cell may be associated with a RAT, such as NR, while the different cell may be associated with another RAT, such as LTE or Wi-Fi. A list of channel rasters for the other RAT may include the updated channel raster.

At 420, UE 115-*b* may determine UE 115-*b* is within a geographic region. In some cases, UE 115-*b* may monitor the other set of one or more frequencies based on being within the geographic region. In some examples, UE 115-*b* may receive an indication of the geographic region with the updated channel raster. In some examples, the geographic region may be defined as a polygon, ellipsoid, etc. within which the updated channel raster applies. In some examples, base station 105-*c*, UE 115-*b*, or both may determine the geographic region based on location information.

At 425, UE 115-*b* may determine a timing threshold of the updated channel raster is satisfied. In some cases, UE 115-*b* may monitor the other set of one or more frequencies based on determining the timing threshold is satisfied. UE 115-*b* may receive an indication of the timing threshold with the updated channel raster. For example, UE 115-*b* may wait until a timer runs out before monitoring the updated channel raster. In some other examples, UE 115-*b* may monitor the updated channel raster until a timer runs out.

Figure 5:
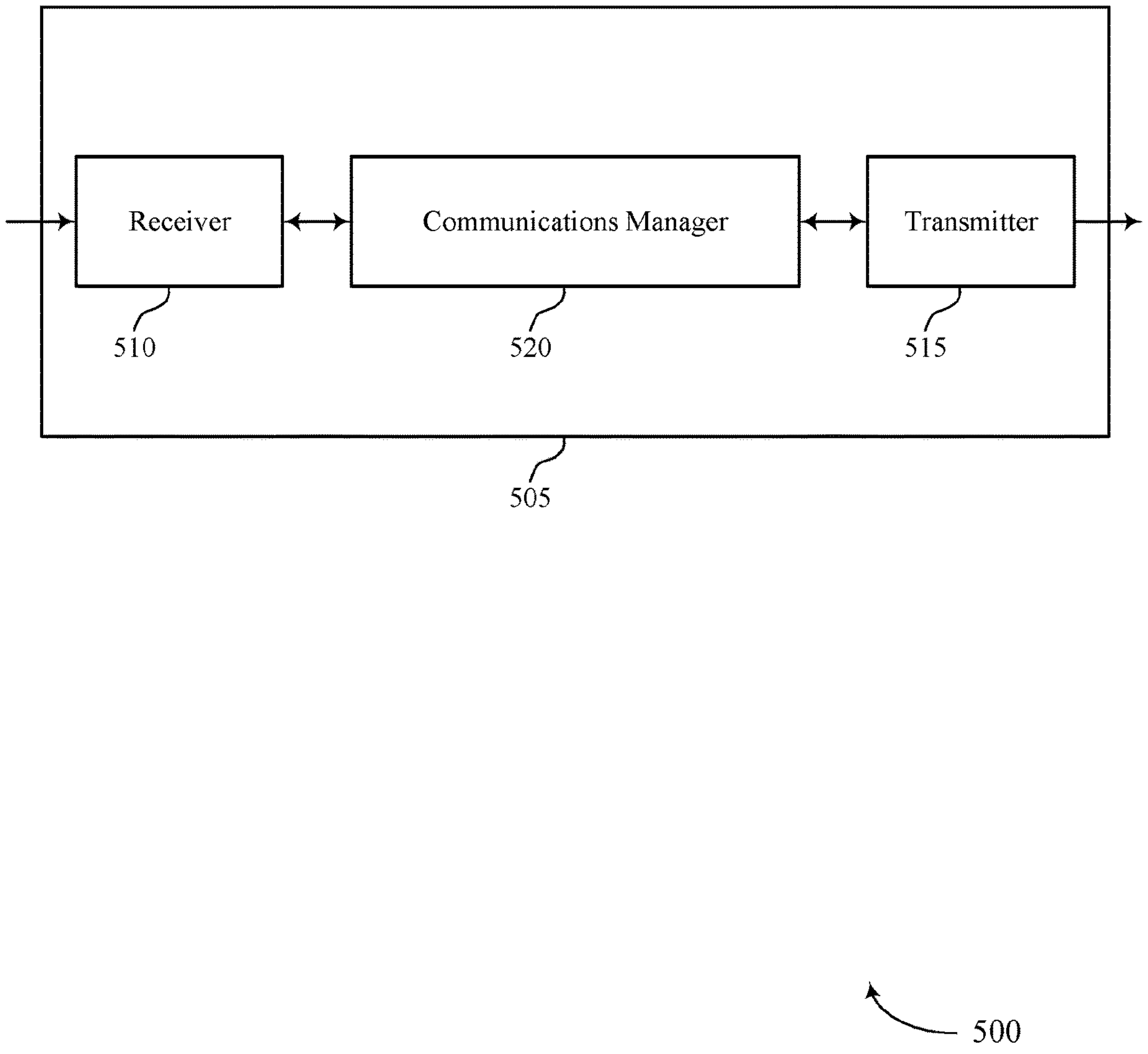
FIGS. 5 and 6 show block diagrams of devices that support a flexible channel raster for a frequency band in accordance with aspects of the present disclosure.

FIG. 5 shows a block diagram 500 of a device 505 that supports a flexible channel raster for a frequency band in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a flexible channel raster for a frequency band). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a flexible channel raster for a frequency band). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of a flexible channel raster for a frequency band as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for monitoring a first set of one or more frequencies within a first frequency band for a first SSB associated with a first cell, the first set of one or more frequencies corresponding to a first channel raster. The communications manager 520 may be configured as or otherwise support a means for receiving, from the first cell and based on the monitoring, an indication of a second channel raster corresponding to a second frequency band (e.g., the same as the first frequency band), where the second channel raster is different from the first channel raster. The communications manager 520 may be configured as or otherwise support a means for monitoring a second set of one or more frequencies within the second frequency band for a second SSB associated with at least one second cell of a set of multiple second cells, the second set of one or more frequencies corresponding to the second channel raster.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a base station or cell to transmit an updated channel raster to a UE for monitoring for SSBs, which may cause reduced processing, reduced power consumption, more efficient utilization of communication resources, and the like.

Figure 6:
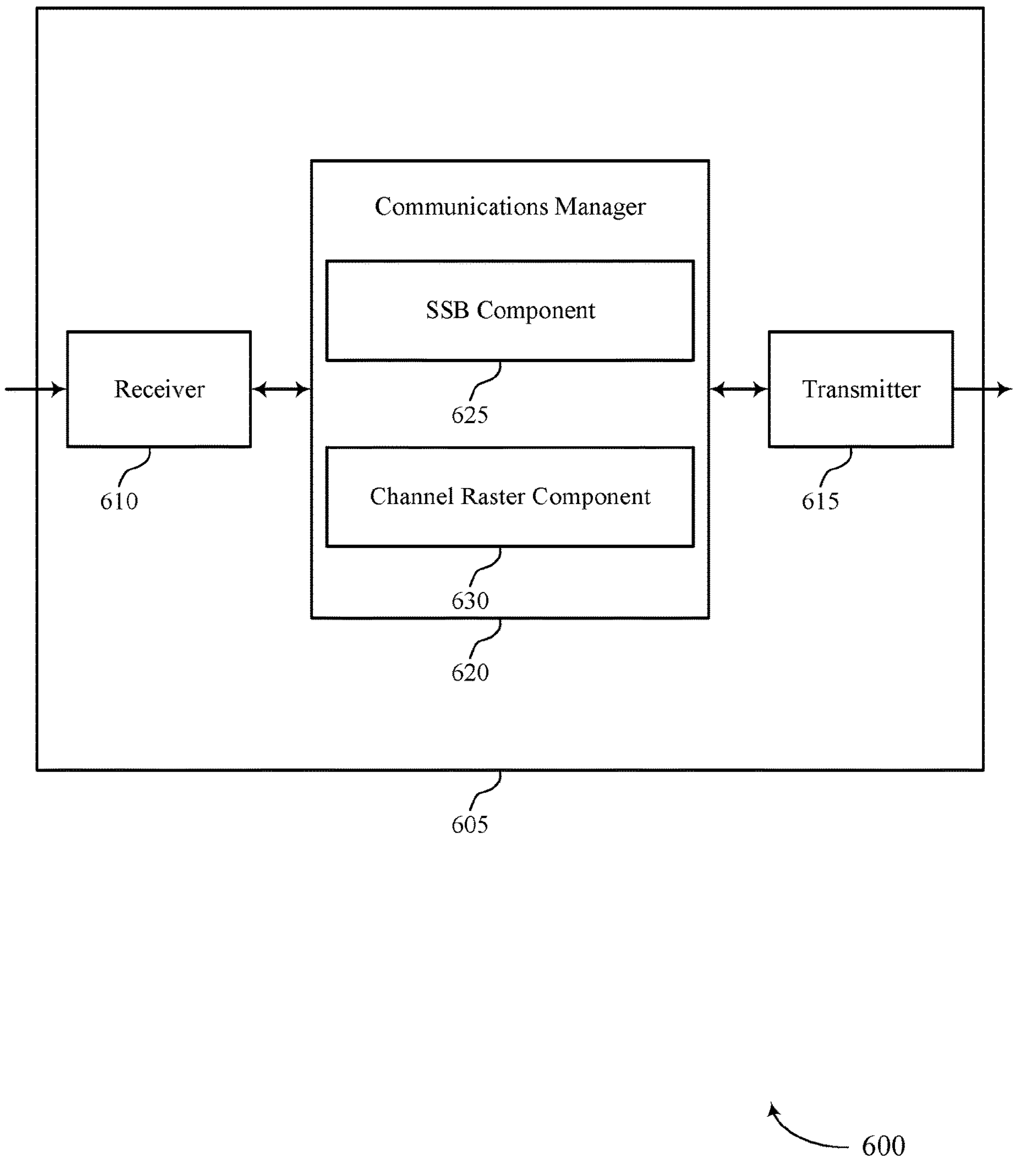

FIG. 6 shows a block diagram 600 of a device 605 that supports a flexible channel raster for a frequency band in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a flexible channel raster for a frequency band). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a flexible channel raster for a frequency band). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of a flexible channel raster for a frequency band as described herein. For example, the communications manager 620 may include an SSB component 625 a channel raster component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The SSB component 625 may be configured as or otherwise support a means for monitoring a first set of one or more frequencies within a first frequency band for a first SSB associated with a first cell, the first set of one or more frequencies corresponding to a first channel raster. The channel raster component 630 may be configured as or otherwise support a means for receiving, from the first cell and based on the monitoring, an indication of a second channel raster corresponding to a second frequency band, where the second channel raster is different from the first channel raster. The SSB component 625 may be configured as or otherwise support a means for monitoring a second set of one or more frequencies within the second frequency band for a second SSB associated with at least one second cell of a set of multiple second cells, the second set of one or more frequencies corresponding to the second channel raster.

Figure 7:
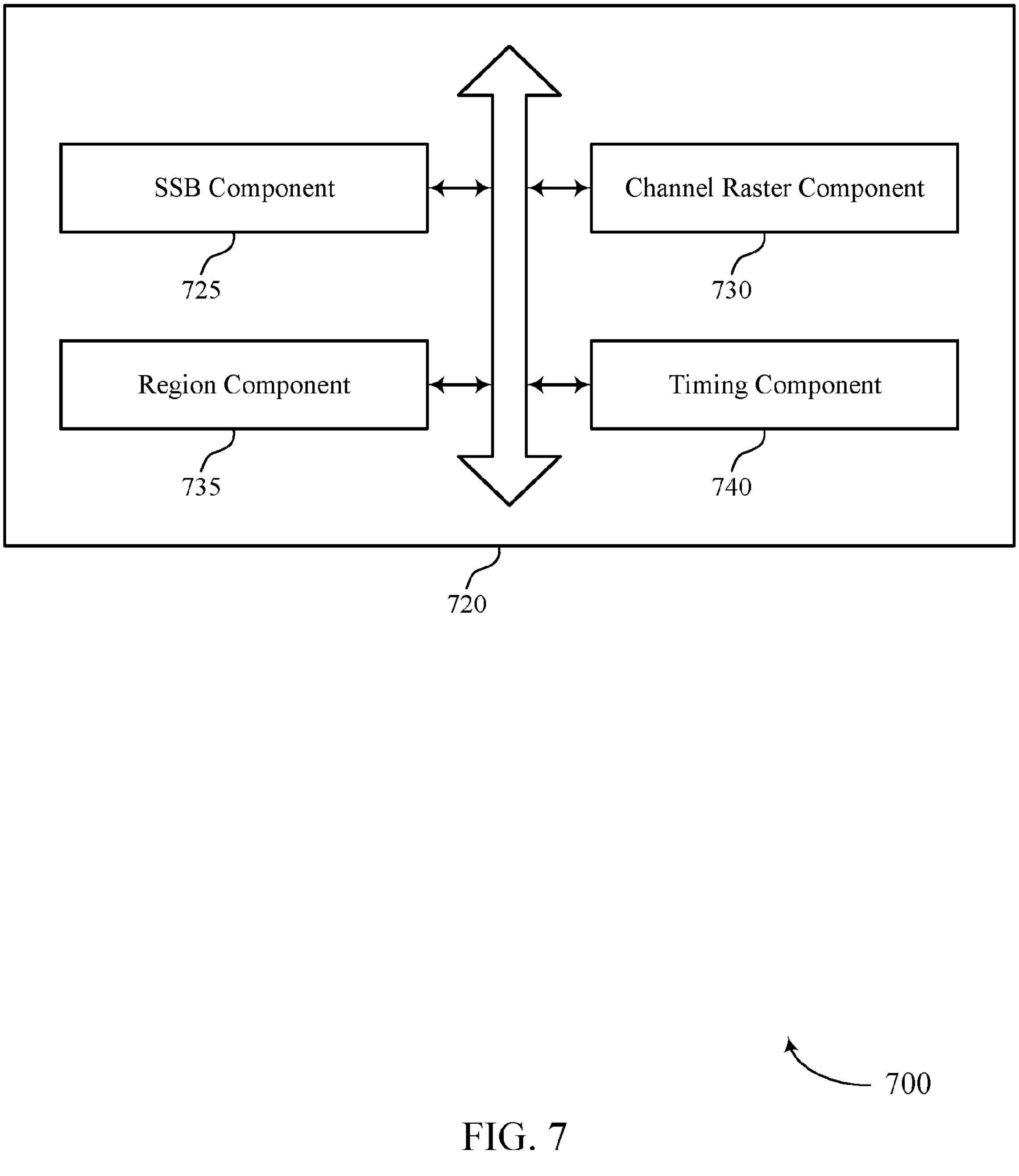
FIG. 7 shows a block diagram of a communications manager that supports a flexible channel raster for a frequency band in accordance with aspects of the present disclosure.

FIG. 7 shows a block diagram 700 of a communications manager 720 that supports a flexible channel raster for a frequency band in accordance with aspects of the present disclosure. The communications manager 720 may be an example of aspects of a communications manager 520, a communications manager 620, or both, as described herein. The communications manager 720, or various components thereof, may be an example of means for performing various aspects of a flexible channel raster for a frequency band as described herein. For example, the communications manager 720 may include an SSB component 725, a channel raster component 730, a region component 735, a timing component 740, or any combination thereof. Each of these components may communicate, directly or indirectly, with one another (e.g., via one or more buses).

The communications manager 720 may support wireless communications at a UE in accordance with examples as disclosed herein. The SSB component 725 may be configured as or otherwise support a means for monitoring a first set of one or more frequencies within a first frequency band for a first SSB associated with a first cell, the first set of one or more frequencies corresponding to a first channel raster. The channel raster component 730 may be configured as or otherwise support a means for receiving, from the first cell and based on the monitoring, an indication of a second channel raster corresponding to a second frequency band, where the second channel raster is different from the first channel raster. In some examples, the SSB component 725 may be configured as or otherwise support a means for monitoring a second set of one or more frequencies within the second frequency band for a second SSB associated with at least one second cell of a set of multiple second cells, the second set of one or more frequencies corresponding to the second channel raster.

In some examples, the region component 735 may be configured as or otherwise support a means for determining the UE is within a geographic region, where monitoring the second set of one or more frequencies is based on determining the UE is within the geographic region.

In some examples, to support receiving the indication of the second channel raster, the region component 735 may be configured as or otherwise support a means for receiving an indication of the geographic region associated with the second channel raster.

In some examples, the timing component 740 may be configured as or otherwise support a means for determining a timing threshold associated with the second channel raster is satisfied, where monitoring the second set of one or more frequencies is based on determining the timing threshold associated with the second channel raster is satisfied.

In some examples, to support receiving the indication of the second channel raster, the timing component 740 may be configured as or otherwise support a means for receiving an indication of the timing threshold associated with the second channel raster.

In some examples, to support receiving the indication of the second channel raster, the channel raster component 730 may be configured as or otherwise support a means for receiving one or more of: a SIB including the indication of the second channel raster, RRC signaling including the indication of the second channel raster, or a MAC-CE including the indication of the second channel raster.

In some examples, the indication of the second channel raster includes one or more bandwidths associated with the second channel raster. In some cases, the first frequency band may be the same as the second frequency band. In some other cases, the first frequency band may be different form the second frequency band (e.g., may include different frequency ranges).

In some examples, the first cell is associated with a first RAT and the at least one second cell is associated with a second RAT. In some examples, a list of channel rasters for the second RAT includes the second channel raster.

Figure 8:
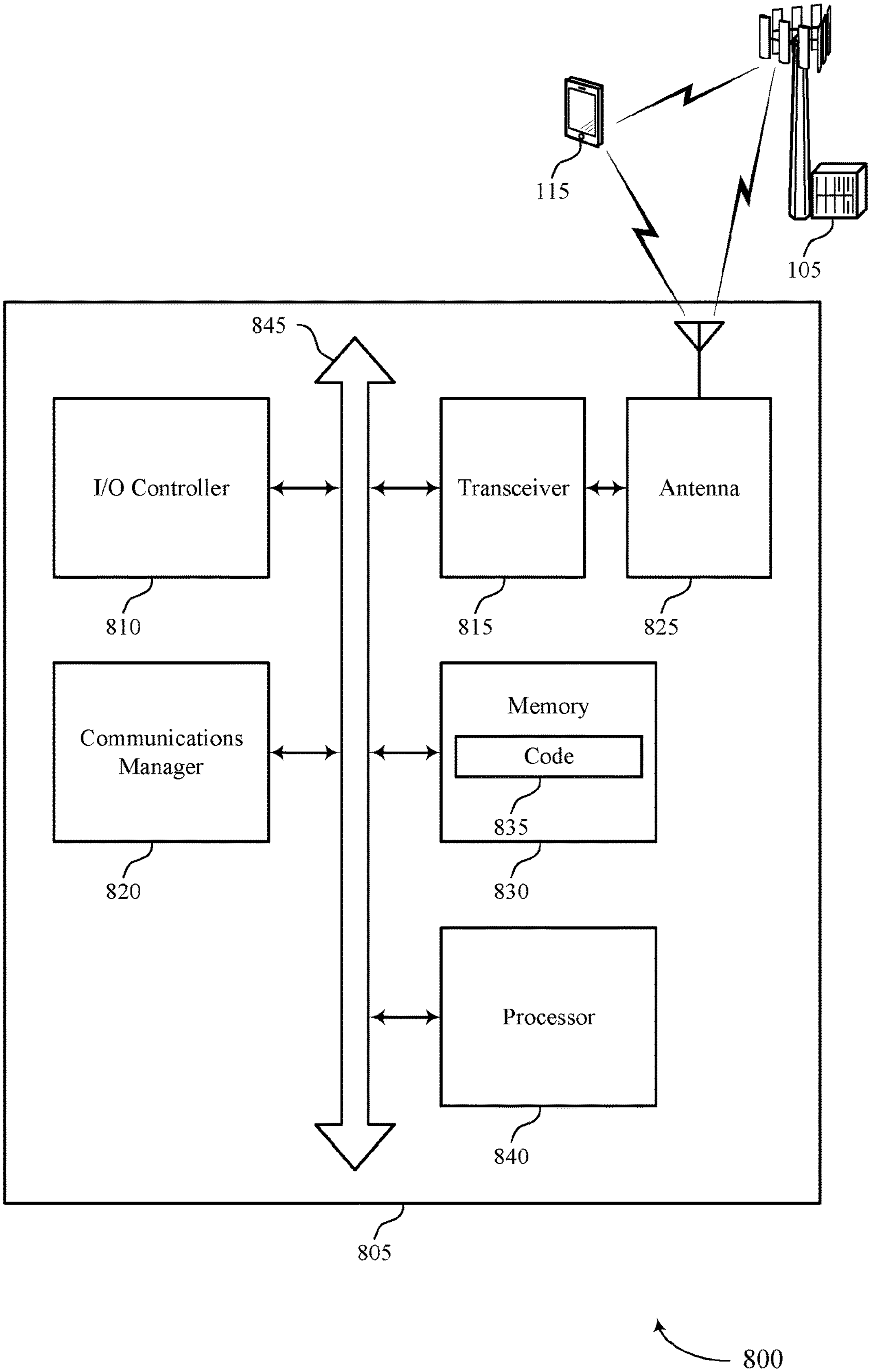
FIG. 8 shows a diagram of a system including a device that supports a flexible channel raster for a frequency band in accordance with aspects of the present disclosure.

FIG. 8 shows a diagram of a system 800 including a device 805 that supports a flexible channel raster for a frequency band in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting a flexible channel raster for a frequency band). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for monitoring a first set of one or more frequencies within a first frequency band for a first SSB associated with a first cell, the first set of one or more frequencies corresponding to a first channel raster. The communications manager 820 may be configured as or otherwise support a means for receiving, from the first cell and based on the monitoring, an indication of a second channel raster corresponding to a second frequency band, where the second channel raster is different from the first channel raster. The communications manager 820 may be configured as or otherwise support a means for monitoring a second set of one or more frequencies within the second frequency band for a second SSB associated with at least one second cell of a set of multiple second cells, the second set of one or more frequencies corresponding to the second channel raster.

By including or configuring the communications manager 820 in accordance with examples as described herein, the device 805 may support techniques for a base station or cell to transmit an updated channel raster to a UE for monitoring for SSBs, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of a flexible channel raster for a frequency band as described herein, or the processor 840 and the memory 830 may be otherwise configured to perform or support such operations.

Figure 9:
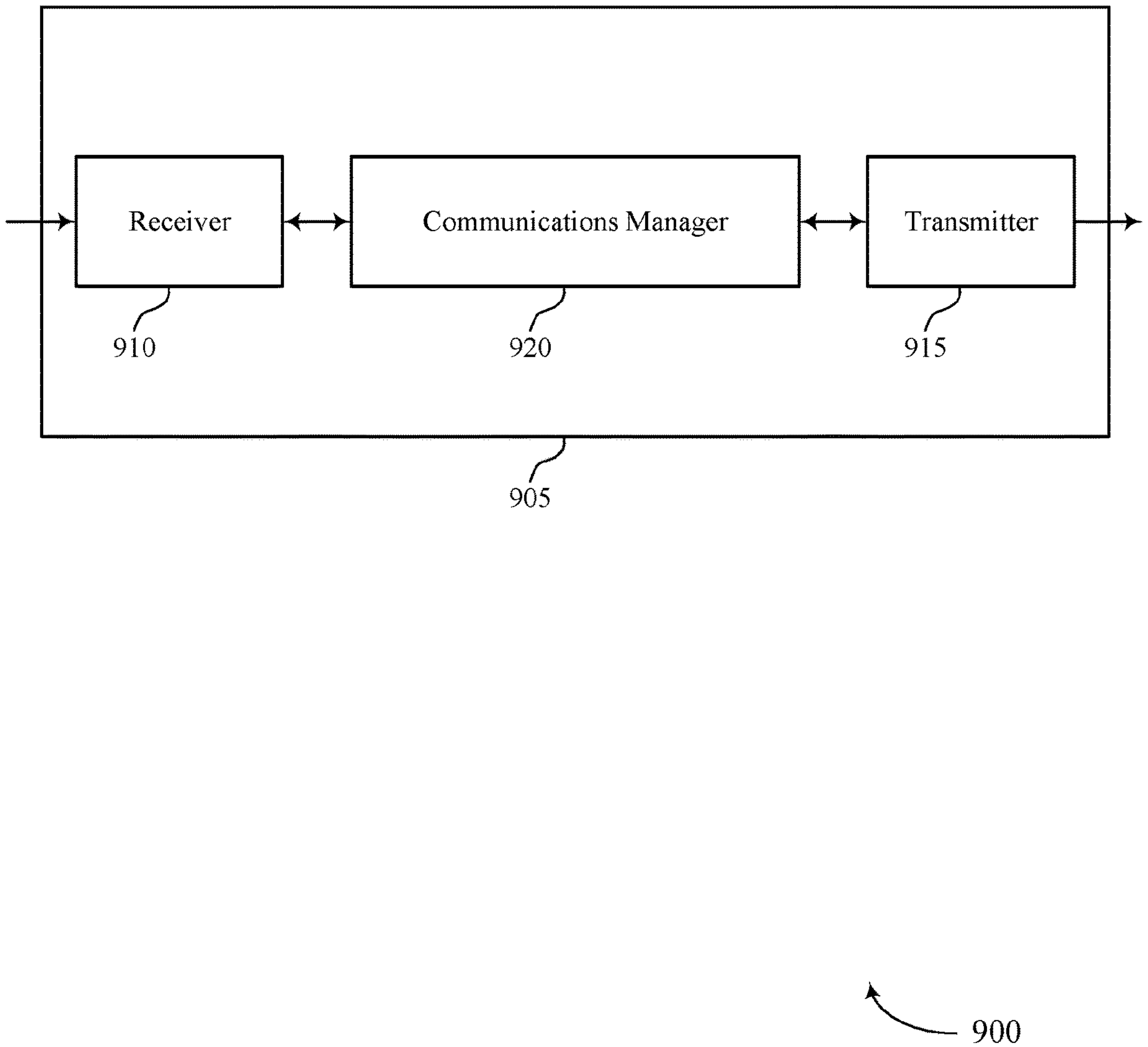
FIGS. 9 and 10 show block diagrams of devices that support a flexible channel raster for a frequency band in accordance with aspects of the present disclosure.

FIG. 9 shows a block diagram 900 of a device 905 that supports a flexible channel raster for a frequency band in accordance with aspects of the present disclosure. The device 905 may be an example of aspects of a cell as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a flexible channel raster for a frequency band). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a flexible channel raster for a frequency band). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a flexible channel raster for a frequency band as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first cell in accordance with examples as disclosed herein. For example, the communications manager 920 may be configured as or otherwise support a means for transmitting, to a UE and using a first set of one or more frequencies within a first frequency band, a first SSB associated with the first cell, the first set of one or more frequencies corresponding to a first channel raster. The communications manager 920 may be configured as or otherwise support a means for transmitting, based on transmitting the first SSB, an indication of a second channel raster corresponding to a second frequency band, where the second channel raster is different from the first channel raster and associated with a second set of one or more frequencies within the second frequency band corresponding to at least one second cell of a set of multiple second cells.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for a base station or cell to transmit an updated channel raster to a UE for monitoring for SSBs, which may cause reduced processing, reduced power consumption, more efficient utilization of communication resources, and the like.

Figure 10:
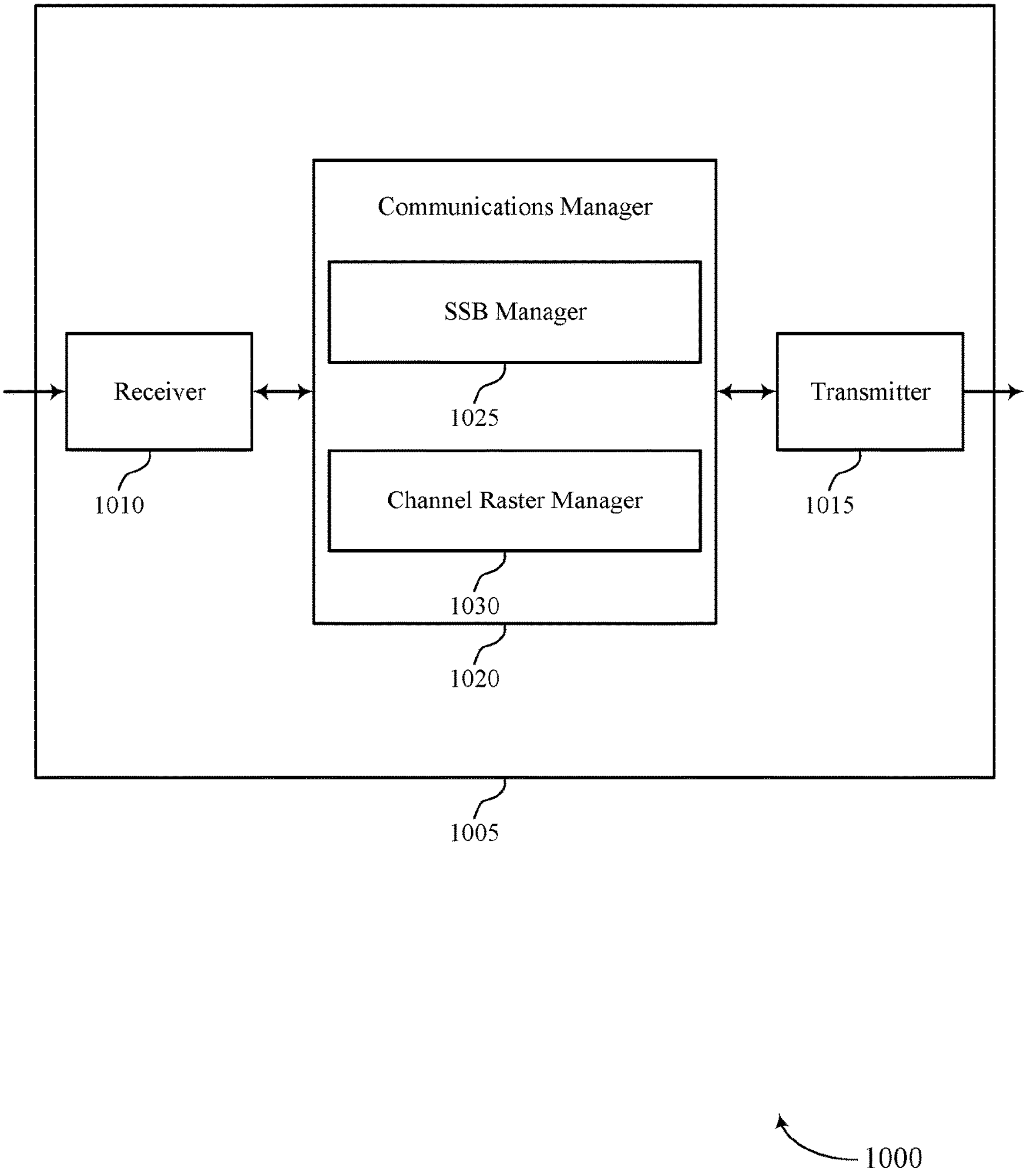

FIG. 10 shows a block diagram 1000 of a device 1005 that supports a flexible channel raster for a frequency band in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a flexible channel raster for a frequency band). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a flexible channel raster for a frequency band). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a flexible channel raster for a frequency band as described herein. For example, the communications manager 1020 may include an SSB manager 1025 a channel raster manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first cell in accordance with examples as disclosed herein. The SSB manager 1025 may be configured as or otherwise support a means for transmitting, to a UE and using a first set of one or more frequencies within a first frequency band, a first SSB associated with the first cell, the first set of one or more frequencies corresponding to a first channel raster. The channel raster manager 1030 may be configured as or otherwise support a means for transmitting, based on transmitting the first SSB, an indication of a second channel raster corresponding to a second frequency band, where the second channel raster is different from the first channel raster and associated with a second set of one or more frequencies within the second frequency band corresponding to at least one second cell of a set of multiple second cells.

Figure 11:
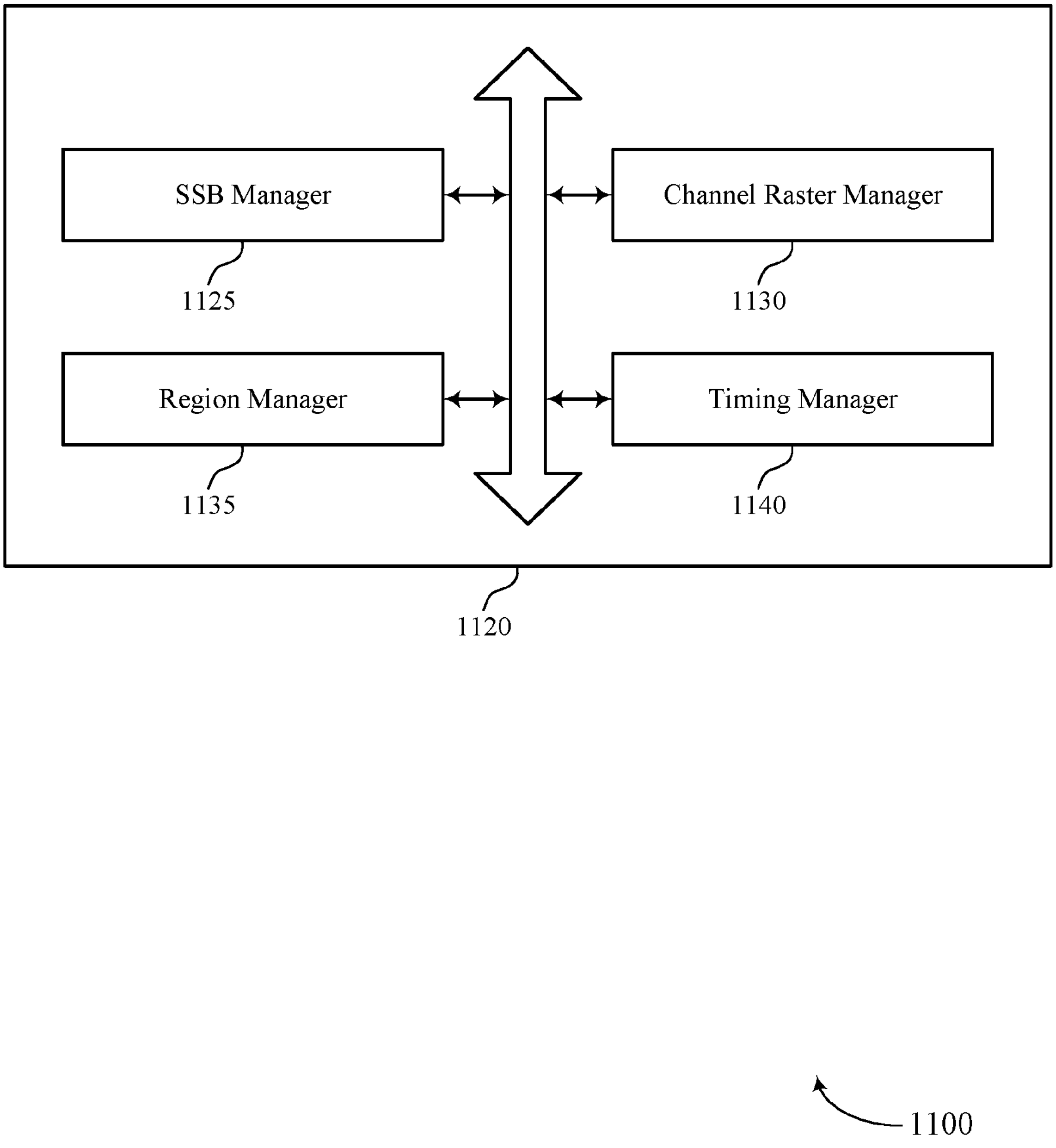
FIG. 11 shows a block diagram of a communications manager that supports a flexible channel raster for a frequency band in accordance with aspects of the present disclosure.

FIG. 11 shows a block diagram 1100 of a communications manager 1120 that supports a flexible channel raster for a frequency band in accordance with aspects of the present disclosure. The communications manager 1120 may be an example of aspects of a communications manager 920, a communications manager 1020, or both, as described herein. The communications manager 1120, or various components thereof, may be an example of means for performing various aspects of a flexible channel raster for a frequency band as described herein. For example, the communications manager 1120 may include an SSB manager 1125, a channel raster manager 1130, a region manager 1135, a timing manager 1140, or any combination thereof. Each of these components may communicate, directly or indirectly, with one another (e.g., via one or more buses).

The communications manager 1120 may support wireless communications at a first cell in accordance with examples as disclosed herein. The SSB manager 1125 may be configured as or otherwise support a means for transmitting, to a UE and using a first set of one or more frequencies within a first frequency band, a first SSB associated with the first cell, the first set of one or more frequencies corresponding to a first channel raster. The channel raster manager 1130 may be configured as or otherwise support a means for transmitting, based on transmitting the first SSB, an indication of a second channel raster corresponding to a second frequency band, where the second channel raster is different from the first channel raster and associated with a second set of one or more frequencies within the second frequency band corresponding to at least one second cell of a set of multiple second cells.

In some examples, the region manager 1135 may be configured as or otherwise support a means for determining the UE is within a geographic region, where transmitting the indication of the second channel raster is based on determining the UE is within the geographic region.

In some examples, to support transmitting the indication of the second channel raster, the region manager 1135 may be configured as or otherwise support a means for transmitting an indication of the geographic region associated with the second channel raster.

In some examples, the timing manager 1140 may be configured as or otherwise support a means for determining a timing threshold associated with the second channel raster is satisfied, where transmitting the indication of the second channel raster is based on determining the timing threshold associated with the second channel raster is satisfied.

In some examples, to support transmitting the indication of the second channel raster, the timing manager 1140 may be configured as or otherwise support a means for transmitting an indication of the timing threshold associated with the second channel raster.

In some examples, to support transmitting the indication of the second channel raster, the channel raster manager 1130 may be configured as or otherwise support a means for transmitting a SIB including the indication of the second channel raster, transmitting RRC signaling including the indication of the second channel raster, or transmitting a MAC-CE including the indication of the second channel raster.

In some examples, the indication of the second channel raster includes one or more bandwidths associated with the second channel raster. In some cases, the first frequency band may be the same as the second frequency band. In some other cases, the first frequency band may be different from the second frequency band.

In some examples, the first cell is associated with a first RAT and the at least one second cell is associated with a second RAT. In some examples, a list of channel rasters for the second RAT includes the second channel raster.

Figure 12:
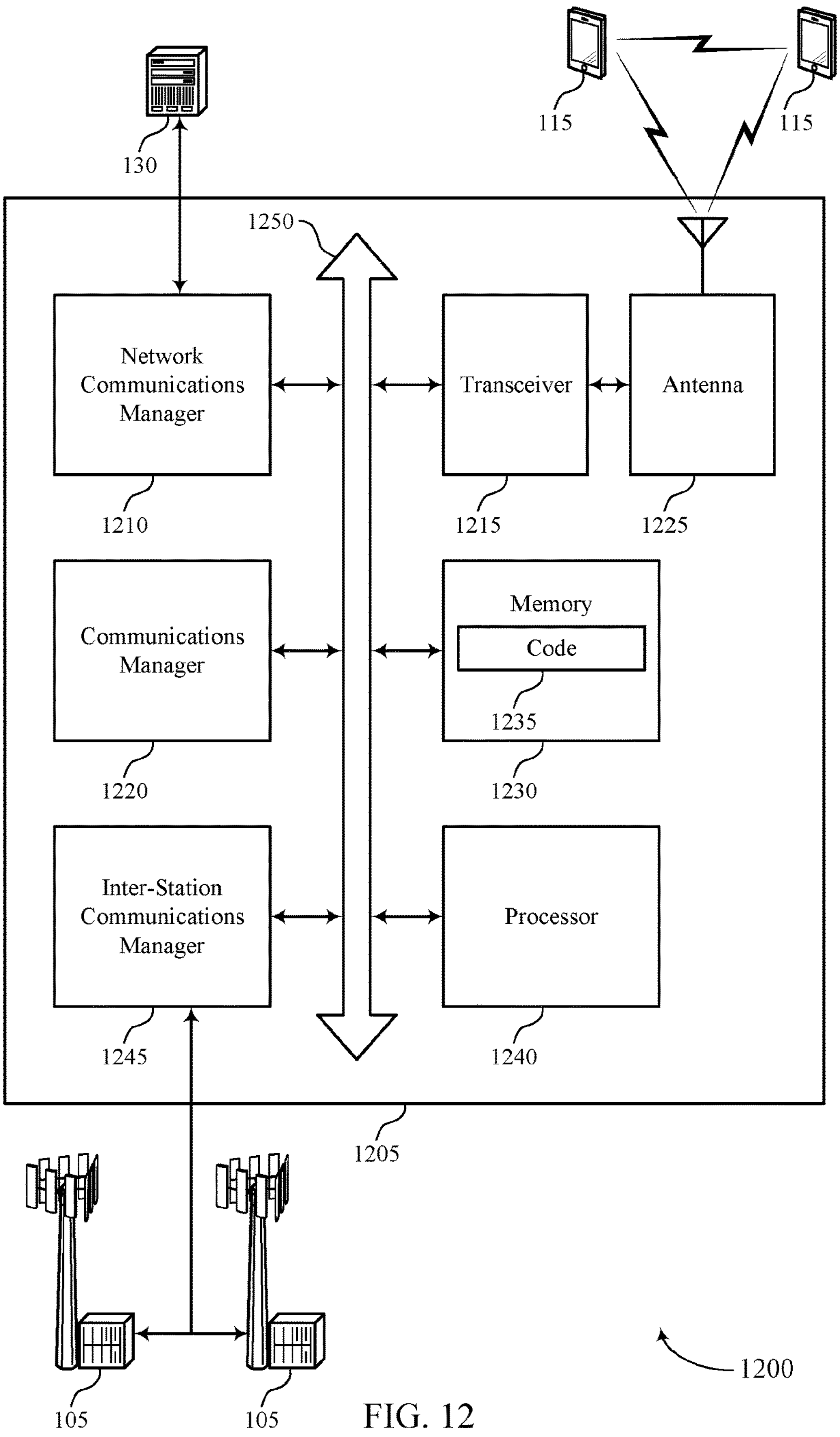
FIG. 12 shows a diagram of a system including a device that supports a flexible channel raster for a frequency band in accordance with aspects of the present disclosure.

FIG. 12 shows a diagram of a system 1200 including a device 1205 that supports a flexible channel raster for a frequency band in accordance with aspects of the present disclosure. The device 1205 may be an example of or include the components of a device 905, a device 1005, or a cell as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting a flexible channel raster for a frequency band). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a first cell in accordance with examples as disclosed herein. For example, the communications manager 1220 may be configured as or otherwise support a means for transmitting, to a UE and using a first set of one or more frequencies within a first frequency band, a first SSB associated with the first cell, the first set of one or more frequencies corresponding to a first channel raster. The communications manager 1220 may be configured as or otherwise support a means for transmitting, based on transmitting the first SSB, an indication of a second channel raster corresponding to a second frequency band, where the second channel raster is different from the first channel raster and associated with a second set of one or more frequencies within the second frequency band corresponding to at least one second cell of a set of multiple second cells.

By including or configuring the communications manager 1220 in accordance with examples as described herein, the device 1205 may support techniques for a base station or cell to transmit an updated channel raster to a UE for monitoring for SSBs, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of a flexible channel raster for a frequency band as described herein, or the processor 1240 and the memory 1230 may be otherwise configured to perform or support such operations.

Figure 13:
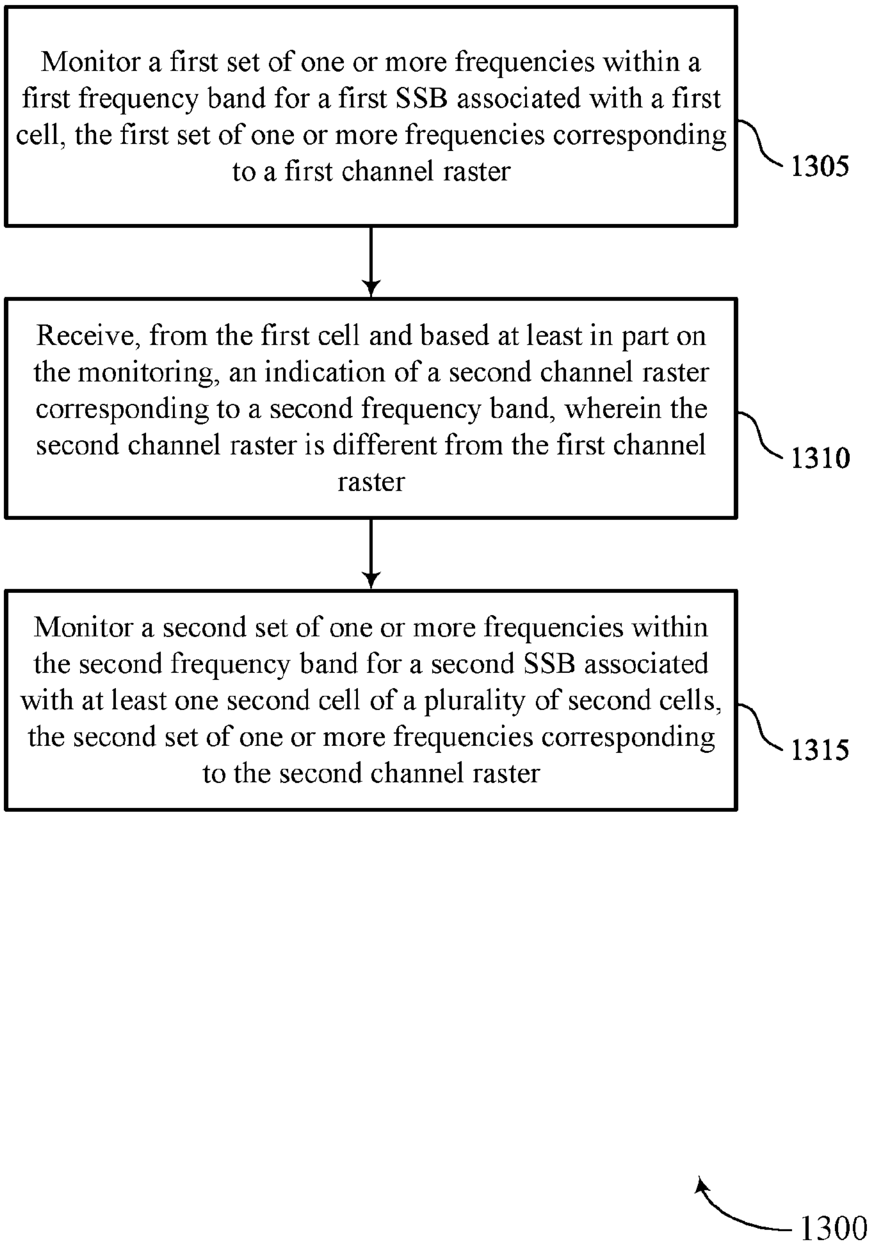
FIGS. 13 through 16 show flowcharts illustrating methods that support a flexible channel raster for a frequency band in accordance with aspects of the present disclosure.

FIG. 13 shows a flowchart illustrating a method 1300 that supports a flexible channel raster for a frequency band in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include monitoring a first set of one or more frequencies within a first frequency band for a first SSB associated with a first cell, the first set of one or more frequencies corresponding to a first channel raster. The operations of 1305 may be performed in accordance with examples as disclosed herein. In some examples, aspects of the operations of 1305 may be performed by an SSB component 725 as described with reference to FIG. 7.

At 1310, the method may include receiving, from the first cell and based on the monitoring, an indication of a second channel raster corresponding to a second frequency band, where the second channel raster is different from the first channel raster. The operations of 1310 may be performed in accordance with examples as disclosed herein. In some examples, aspects of the operations of 1310 may be performed by a channel raster component 730 as described with reference to FIG. 7.

At 1315, the method may include monitoring a second set of one or more frequencies within the second frequency band for a second SSB associated with at least one second cell of a set of multiple second cells, the second set of one or more frequencies corresponding to the second channel raster. The operations of 1315 may be performed in accordance with examples as disclosed herein. In some examples, aspects of the operations of 1315 may be performed by an SSB component 725 as described with reference to FIG. 7.

Figure 14:
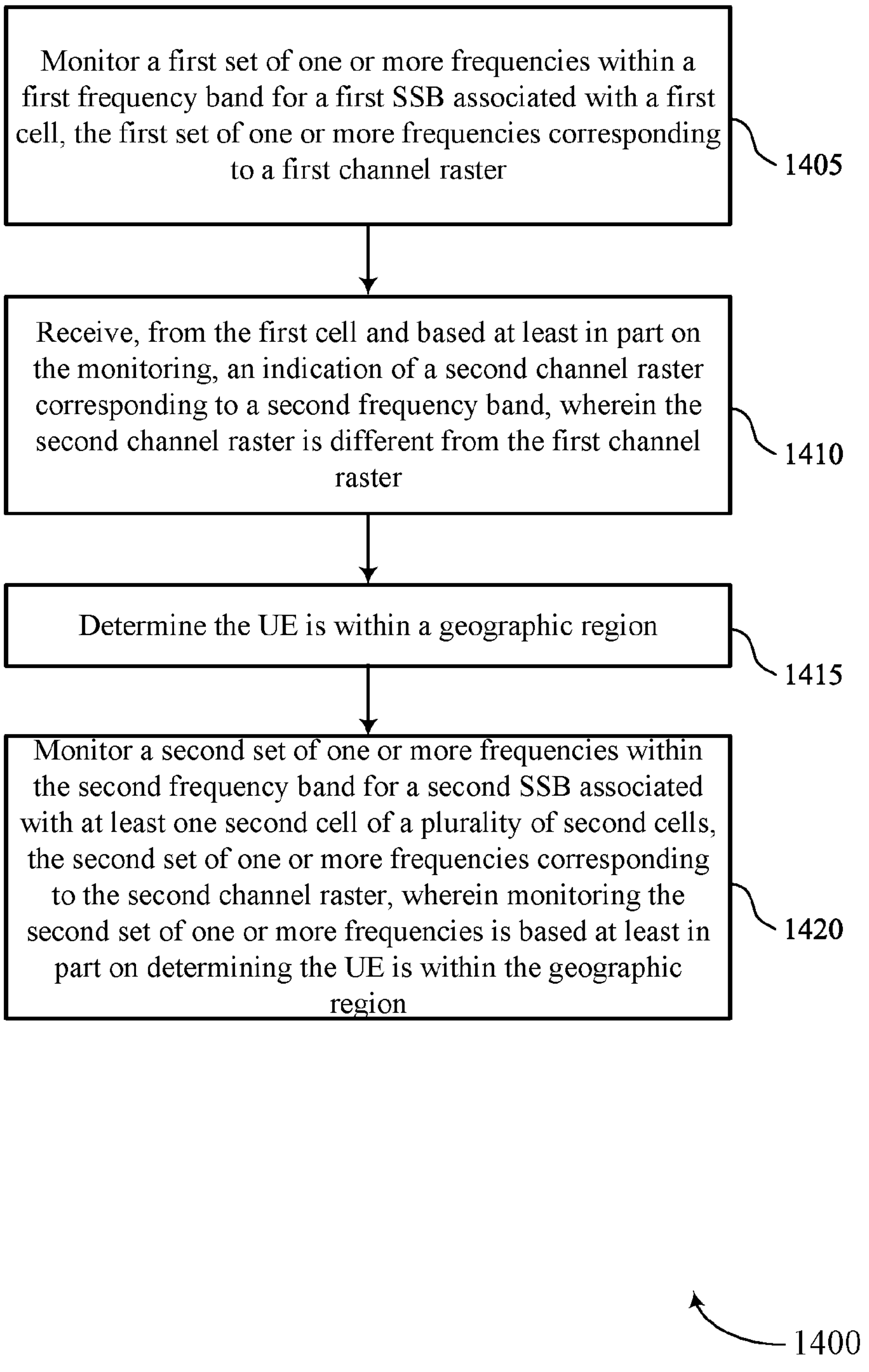

FIG. 14 shows a flowchart illustrating a method 1400 that supports a flexible channel raster for a frequency band in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include monitoring a first set of one or more frequencies within a first frequency band for a first SSB associated with a first cell, the first set of one or more frequencies corresponding to a first channel raster. The operations of 1405 may be performed in accordance with examples as disclosed herein. In some examples, aspects of the operations of 1405 may be performed by an SSB component 725 as described with reference to FIG. 7.

At 1410, the method may include receiving, from the first cell and based on the monitoring, an indication of a second channel raster corresponding to a second frequency band, where the second channel raster is different from the first channel raster. The operations of 1410 may be performed in accordance with examples as disclosed herein. In some examples, aspects of the operations of 1410 may be performed by a channel raster component 730 as described with reference to FIG. 7.

At 1415, the method may include determining the UE is within a geographic region. The operations of 1415 may be performed in accordance with examples as disclosed herein. In some examples, aspects of the operations of 1415 may be performed by a region component 735 as described with reference to FIG. 7.

At 1420, the method may include monitoring a second set of one or more frequencies within the second frequency band for a second SSB associated with at least one second cell of a set of multiple second cells, the second set of one or more frequencies corresponding to the second channel raster, where monitoring the second set of one or more frequencies is based on determining the UE is within the geographic region. The operations of 1420 may be performed in accordance with examples as disclosed herein. In some examples, aspects of the operations of 1420 may be performed by an SSB component 725 as described with reference to FIG. 7.

Figure 15:
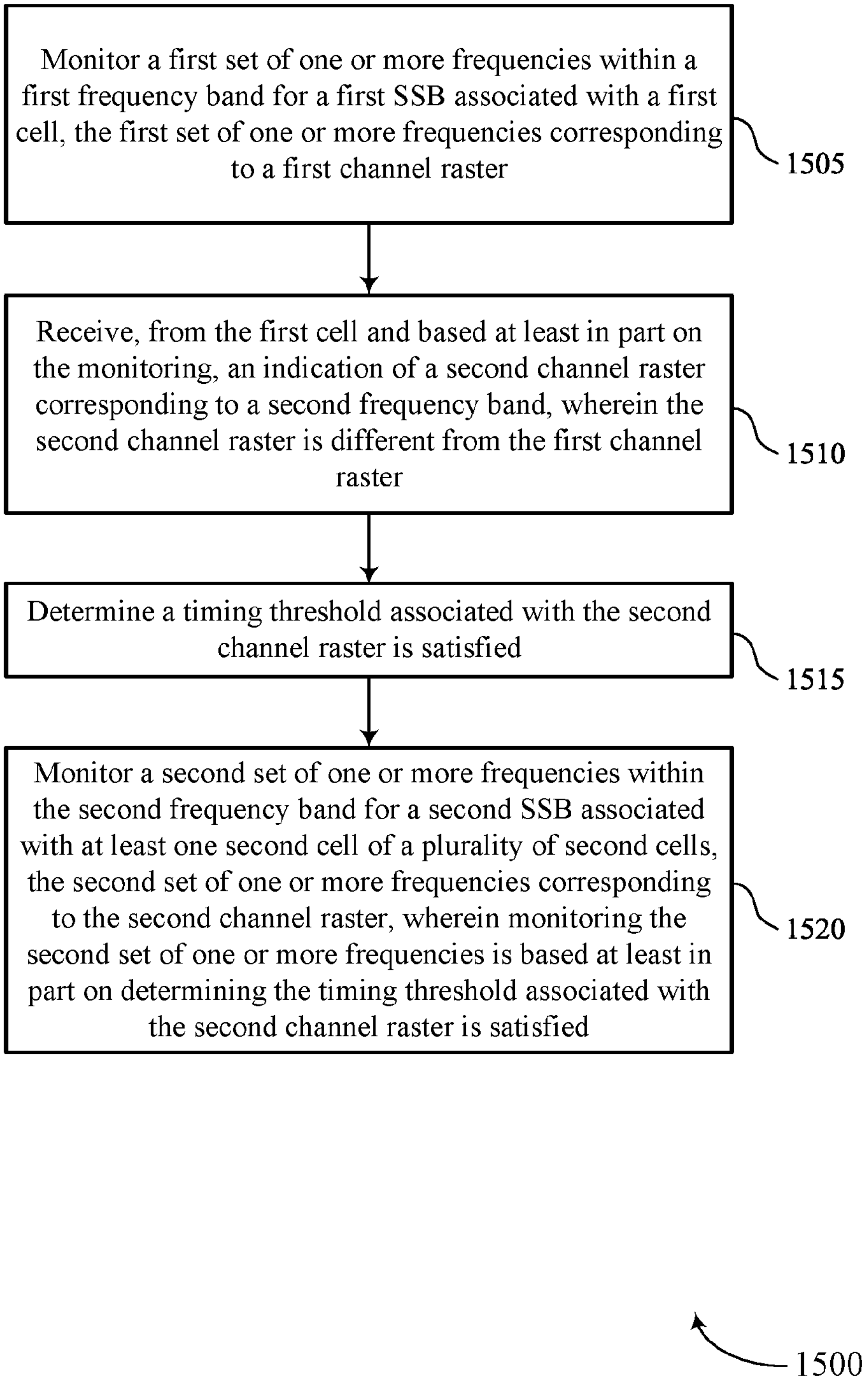

FIG. 15 shows a flowchart illustrating a method 1500 that supports a flexible channel raster for a frequency band in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include monitoring a first set of one or more frequencies within a first frequency band for a first SSB associated with a first cell, the first set of one or more frequencies corresponding to a first channel raster. The operations of 1505 may be performed in accordance with examples as disclosed herein. In some examples, aspects of the operations of 1505 may be performed by an SSB component 725 as described with reference to FIG. 7.

At 1510, the method may include receiving, from the first cell and based on the monitoring, an indication of a second channel raster corresponding to a second frequency band, where the second channel raster is different from the first channel raster. The operations of 1510 may be performed in accordance with examples as disclosed herein. In some examples, aspects of the operations of 1510 may be performed by a channel raster component 730 as described with reference to FIG. 7.

At 1515, the method may include determining a timing threshold associated with the second channel raster is satisfied. The operations of 1515 may be performed in accordance with examples as disclosed herein. In some examples, aspects of the operations of 1515 may be performed by a timing component 740 as described with reference to FIG. 7.

At 1520, the method may include monitoring a second set of one or more frequencies within the second frequency band for a second SSB associated with at least one second cell of a set of multiple second cells, the second set of one or more frequencies corresponding to the second channel raster, where monitoring the second set of one or more frequencies is based on determining the timing threshold associated with the second channel raster is satisfied. The operations of 1520 may be performed in accordance with examples as disclosed herein. In some examples, aspects of the operations of 1520 may be performed by an SSB component 725 as described with reference to FIG. 7.

Figure 16:
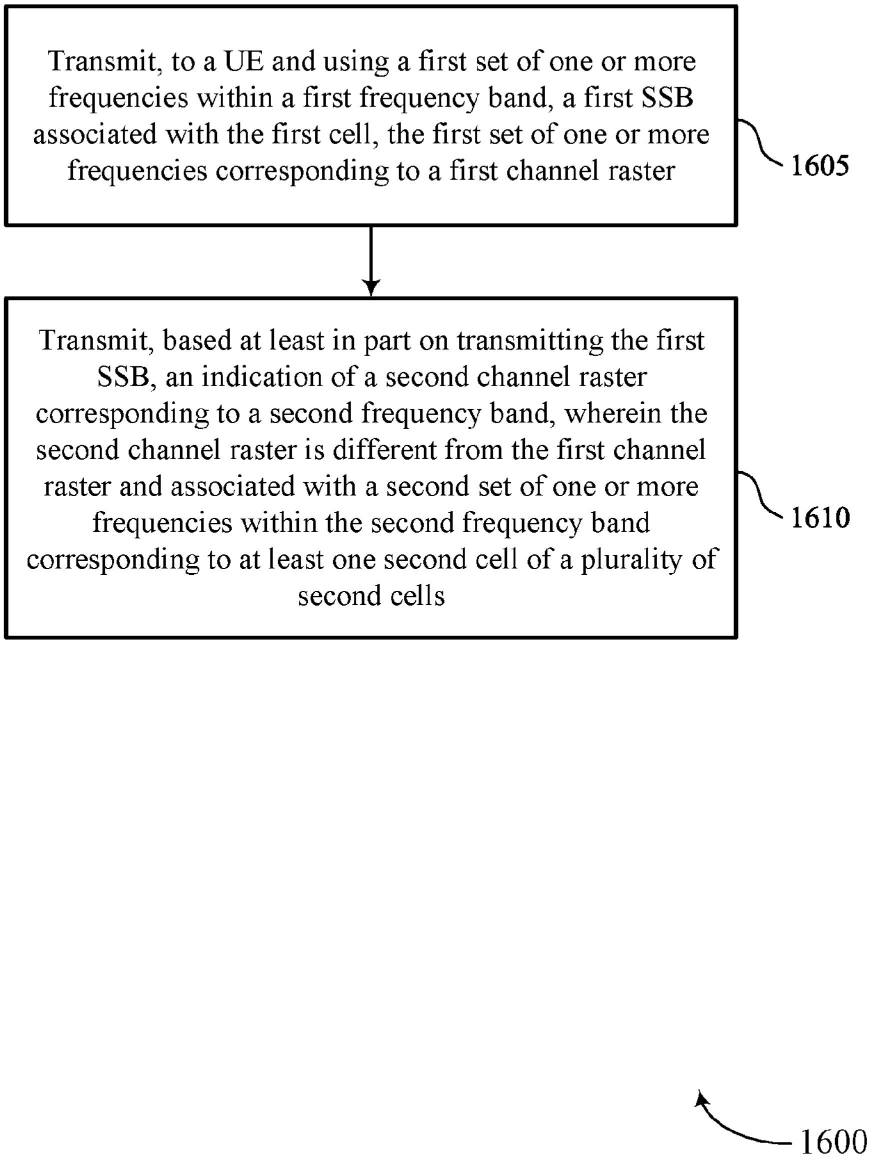

FIG. 16 shows a flowchart illustrating a method 1600 that supports a flexible channel raster for a frequency band in accordance with aspects of the present disclosure. The operations of the method 1600 may be implemented by a cell or its components as described herein. For example, the operations of the method 1600 may be performed by a cell as described with reference to FIGS. 1 through 4 and 9 through 12. In some examples, a cell may execute a set of instructions to control the functional elements of the cell to perform the described functions. Additionally or alternatively, the cell may perform aspects of the described functions using special-purpose hardware.

At 1605, the method may include transmitting, to a UE and using a first set of one or more frequencies within a first frequency band, a first SSB associated with the first cell, the first set of one or more frequencies corresponding to a first channel raster. The operations of 1605 may be performed in accordance with examples as disclosed herein. In some examples, aspects of the operations of 1605 may be performed by an SSB manager 1125 as described with reference to FIG. 11.

At 1610, the method may include transmitting, based on transmitting the first SSB, an indication of a second channel raster corresponding to a second frequency band, where the second channel raster is different from the first channel raster and associated with a second set of one or more frequencies within the second frequency band corresponding to at least one second cell of a set of multiple second cells. The operations of 1610 may be performed in accordance with examples as disclosed herein. In some examples, aspects of the operations of 1610 may be performed by a channel raster manager 1130 as described with reference to FIG. 11.

The following provides an overview of aspects of the present disclosure:

Aspect 1: A method for wireless communications at a UE, comprising: monitoring a first set of one or more frequencies within a frequency band for a first synchronization signal block associated with a first cell, the first set of one or more frequencies corresponding to a first channel raster; receiving, from the first cell and based at least in part on the monitoring, an indication of a second channel raster corresponding to the frequency band, wherein the second channel raster is different from the first channel raster; and monitoring a second set of one or more frequencies within the frequency band for a second synchronization signal block associated with at least one second cell of a plurality of second cells, the second set of one or more frequencies corresponding to the second channel raster.

Aspect 2: The method of aspect 1, further comprising: determining the UE is within a geographic region, wherein monitoring the second set of one or more frequencies is based at least in part on determining the UE is within the geographic region.

Aspect 3: The method of aspect 2, wherein receiving the indication of the second channel raster comprises: receiving an indication of the geographic region associated with the second channel raster.

Aspect 4: The method of any of aspects 1 through 3, further comprising: determining a timing threshold associated with the second channel raster is satisfied, wherein monitoring the second set of one or more frequencies is based at least in part on determining the timing threshold associated with the second channel raster is satisfied.

Aspect 5: The method of aspect 4, wherein receiving the indication of the second channel raster comprises: receiving an indication of the timing threshold associated with the second channel raster.

Aspect 6: The method of any of aspects 1 through 5, wherein receiving the indication of the second channel raster comprises: receiving one or more of: a system information block comprising the indication of the second channel raster, radio resource control signaling comprising the indication of the second channel raster, or a medium access control-control element comprising the indication of the second channel raster.

Aspect 7: The method of any of aspects 1 through 6, wherein the indication of the second channel raster comprises one or more bandwidths associated with the second channel raster.

Aspect 8: The method of any of aspects 1 through 7, wherein the first cell is associated with a first radio access technology and the at least one second cell is associated with a second radio access technology.

Aspect 9: The method of aspect 8, wherein a list of channel rasters for the second radio access technology comprises the second channel raster.

Aspect 10: A method for wireless communications at a first cell, comprising: transmitting, to a UE and using a first set of one or more frequencies within a frequency band, a first synchronization signal block associated with the first cell, the first set of one or more frequencies corresponding to a first channel raster; and transmitting, based at least in part on transmitting the first synchronization signal block, an indication of a second channel raster corresponding to the frequency band, wherein the second channel raster is different from the first channel raster and associated with a second set of one or more frequencies within the frequency band corresponding to at least one second cell of a plurality of second cells.

Aspect 11: The method of aspect 10, further comprising: determining the UE is within a geographic region, wherein transmitting the indication of the second channel raster is based at least in part on determining the UE is within the geographic region.

Aspect 12: The method of aspect 11, wherein transmitting the indication of the second channel raster comprises: transmitting an indication of the geographic region associated with the second channel raster.

Aspect 13: The method of any of aspects 10 through 12, further comprising: determining a timing threshold associated with the second channel raster is satisfied, wherein transmitting the indication of the second channel raster is based at least in part on determining the timing threshold associated with the second channel raster is satisfied.

Aspect 14: The method of aspect 13, wherein transmitting the indication of the second channel raster comprises: transmitting an indication of the timing threshold associated with the second channel raster.

Aspect 15: The method of any of aspects 10 through 14, wherein transmitting the indication of the second channel raster comprises: transmitting a system information block comprising the indication of the second channel raster, transmitting radio resource control signaling comprising the indication of the second channel raster, or transmitting a medium access control-control element comprising the indication of the second channel raster.

Aspect 16: The method of any of aspects 10 through 15, wherein the indication of the second channel raster comprises one or more bandwidths associated with the second channel raster.

Aspect 17: The method of any of aspects 10 through 16, wherein the first cell is associated with a first radio access technology and the at least one second cell is associated with a second radio access technology.

Aspect 18: The method of aspect 17, wherein a list of channel rasters for the second radio access technology comprises the second channel raster.

Aspect 19: An apparatus for wireless communications at a UE, comprising a processor; memory coupled with the processor; and instructions stored in the memory and executable by the processor to cause the apparatus to perform a method of any of aspects 1 through 9.

Aspect 20: An apparatus for wireless communications at a UE, comprising at least one means for performing a method of any of aspects 1 through 9.

Aspect 21: A non-transitory computer-readable medium storing code for wireless communications at a UE, the code comprising instructions executable by a processor to perform a method of any of aspects 1 through 9.

Aspect 22: An apparatus for wireless communications at a first cell, comprising a processor; memory coupled with the processor; and instructions stored in the memory and executable by the processor to cause the apparatus to perform a method of any of aspects 10 through 18.

Aspect 23: An apparatus for wireless communications at a first cell, comprising at least one means for performing a method of any of aspects 10 through 18.

Aspect 24: A non-transitory computer-readable medium storing code for wireless communications at a first cell, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one processor;

memory coupled with the at least one processor; and instructions stored in the memory and executable by the at least one processor to cause the apparatus to:

monitor a first set of one or more frequencies within a first frequency band for a first synchronization signal block associated with a first cell, the first set of one or more frequencies corresponding to a first channel raster;

receive, from the first cell and based at least in part on the monitoring, an indication of a channel raster update, wherein the channel raster update indicates a second channel raster corresponding to a second frequency band, and wherein the second channel raster is different from the first channel raster; and monitor, in accordance with the channel raster update, a second set of one or more frequencies within the second frequency band for a second synchronization signal block associated with at least one second cell of a plurality of second cells, the second set of one or more frequencies corresponding to the second channel raster.

2. The apparatus of claim 1, wherein the instructions are further executable by the at least one processor to cause the apparatus to:

determine the UE is within a geographic region, wherein monitoring the second set of one or more frequencies is based at least in part on determining the UE is within the geographic region.

3. The apparatus of claim 2, wherein the instructions to receive the indication of the second channel raster are executable by the at least one processor to cause the apparatus to:

receive an indication of the geographic region associated with the second channel raster.

4. The apparatus of claim 1, wherein the instructions are further executable by the at least one processor to cause the apparatus to:

determine a timing threshold associated with the second channel raster is satisfied, wherein monitoring the second set of one or more frequencies is based at least in part on determining the timing threshold associated with the second channel raster is satisfied.

5. The apparatus of claim 4, wherein the instructions to receive the indication of the second channel raster are executable by the at least one processor to cause the apparatus to:

receive an indication of the timing threshold associated with the second channel raster.

6. The apparatus of claim 1, wherein the instructions to receive the indication of the second channel raster are executable by the at least one processor to cause the apparatus to:

receive one or more of: a system information block comprising the indication of the second channel raster, radio resource control signaling comprising the indication of the second channel raster, or a medium access control-control element comprising the indication of the second channel raster.

7. The apparatus of claim 1, wherein the indication of the second channel raster comprises one or more bandwidths associated with the second channel raster.

8. The apparatus of claim 1, wherein the first cell is associated with a first radio access technology and the at least one second cell is associated with a second radio access technology.

9. The apparatus of claim 8, wherein a list of channel rasters for the second radio access technology comprises the second channel raster.

10. The apparatus of claim 1, wherein the first frequency band is the same as the second frequency band.

11. An apparatus for wireless communications at a first cell, comprising:

at least one processor;

memory coupled with the at least one processor; and instructions stored in the memory and executable by the at least one processor to cause the apparatus to:

transmit, to a user equipment (UE) and using a first set of one or more frequencies within a first frequency band, a first synchronization signal block associated with the first cell, the first set of one or more frequencies corresponding to a first channel raster; and transmit, based at least in part on transmitting the first synchronization signal block, an indication of a channel raster update, wherein the channel raster update indicates a second channel raster corresponding to a second frequency band, and wherein the second channel raster is different from the first channel raster and associated with a second set of one or more frequencies within the second frequency band corresponding to at least one second cell of a plurality of second cells.

12. The apparatus of claim 11, wherein the instructions are further executable by the at least one processor to cause the apparatus to:

determine the UE is within a geographic region, wherein transmitting the indication of the second channel raster is based at least in part on determining the UE is within the geographic region.

13. The apparatus of claim 12, wherein the instructions to transmit the indication of the second channel raster are executable by the at least one processor to cause the apparatus to:

transmit an indication of the geographic region associated with the second channel raster.

14. The apparatus of claim 11, wherein the instructions are further executable by the at least one processor to cause the apparatus to:

determine a timing threshold associated with the second channel raster is satisfied, wherein transmitting the indication of the second channel raster is based at least in part on determining the timing threshold associated with the second channel raster is satisfied.

15. The apparatus of claim 14, wherein the instructions to transmit the indication of the second channel raster are executable by the at least one processor to cause the apparatus to:

transmit an indication of the timing threshold associated with the second channel raster.

16. The apparatus of claim 11, wherein the instructions to transmit the indication of the second channel raster are executable by the at least one processor to cause the apparatus to:

transmit a system information block comprising the indication of the second channel raster, transmitting radio resource control signaling comprising the indication of the second channel raster, or transmitting a medium access control-control element comprising the indication of the second channel raster.

17. The apparatus of claim 11, wherein the indication of the second channel raster comprises one or more bandwidths associated with the second channel raster.

18. The apparatus of claim 11, wherein the first cell is associated with a first radio access technology and the at least one second cell is associated with a second radio access technology.

19. The apparatus of claim 18, wherein a list of channel rasters for the second radio access technology comprises the second channel raster.

20. A method for wireless communications at a user equipment (UE), comprising:

monitoring a first set of one or more frequencies within a first frequency band for a first synchronization signal block associated with a first cell, the first set of one or more frequencies corresponding to a first channel raster;

receiving, from the first cell and based at least in part on the monitoring, an indication of a channel raster update, wherein the channel raster update indicates a second channel raster corresponding to a second frequency band, and wherein the second channel raster is different from the first channel raster; and monitoring, in accordance with the channel raster update, a second set of one or more frequencies within the second frequency band for a second synchronization signal block associated with at least one second cell of a plurality of second cells, the second set of one or more frequencies corresponding to the second channel raster.

21. The method of claim 20, further comprising:

determining the UE is within a geographic region, wherein monitoring the second set of one or more frequencies is based at least in part on determining the UE is within the geographic region.

22. The method of claim 21, wherein receiving the indication of the second channel raster comprises:

receiving an indication of the geographic region associated with the second channel raster.

23. The method of claim 20, further comprising:

determining a timing threshold associated with the second channel raster is satisfied, wherein monitoring the second set of one or more frequencies is based at least in part on determining the timing threshold associated with the second channel raster is satisfied.

24. The method of claim 23, wherein receiving the indication of the second channel raster comprises:

receiving an indication of the timing threshold associated with the second channel raster.

25. The method of claim 20, wherein receiving the indication of the second channel raster comprises:

receiving one or more of: a system information block comprising the indication of the second channel raster, radio resource control signaling comprising the indication of the second channel raster, or a medium access control-control element comprising the indication of the second channel raster.

26. The method of claim 20, wherein the indication of the second channel raster comprises one or more bandwidths associated with the second channel raster.

27. The method of claim 20, wherein the first cell is associated with a first radio access technology and the at least one second cell is associated with a second radio access technology.

28. The method of claim 27, wherein a list of channel rasters for the second radio access technology comprises the second channel raster.

29. The method of claim 20, wherein the first frequency band is the same as the second frequency band.

30. A method for wireless communications at a first cell, comprising:

transmitting, to a user equipment (UE) and using a first set of one or more frequencies within a first frequency band, a first synchronization signal block associated with the first cell, the first set of one or more frequencies corresponding to a first channel raster; and transmitting, based at least in part on transmitting the first synchronization signal block, an indication of a channel raster update, wherein the channel raster update indicates a second channel raster corresponding to a second frequency band, and wherein the second channel raster is different from the first channel raster and associated with a second set of one or more frequencies within the second frequency band corresponding to at least one second cell of a plurality of second cells.

* * * * *